(12) United States Patent
Harada et al.

(10) Patent No.: US 7,882,468 B2
(45) Date of Patent: Feb. 1, 2011

(54) INTEGRATED CIRCUIT DEVICE EVALUATION DEVICE, EVALUATION METHOD, AND EVALUATION PROGRAM

(75) Inventors: Takashi Harada, Tokyo (JP); Hiroshi Wabuka, Tokyo (JP)

(73) Assignee: NEC Corporation, Tokyo (JP)

( * ) Notice: Subject to any disclaimer, the term of this patent is extended or adjusted under 35 U.S.C. 154(b) by 575 days.

(21) Appl. No.: 11/910,779

(22) PCT Filed: Apr. 7, 2006

(86) PCT No.: PCT/JP2006/307502

§ 371 (c)(1),
(2), (4) Date: Oct. 5, 2007

(87) PCT Pub. No.: WO2006/109750

PCT Pub. Date: Oct. 19, 2006

(65) Prior Publication Data
US 2009/0019405 A1 Jan. 15, 2009

(30) Foreign Application Priority Data
Apr. 7, 2005 (JP) .............................. 2005-111448

(51) Int. Cl.
*G06F 17/50* (2006.01)
(52) U.S. Cl. ..................... 716/5; 716/1; 716/3; 716/4
(58) Field of Classification Search ............ 716/1, 716/3, 4, 5
See application file for complete search history.

(56) References Cited
U.S. PATENT DOCUMENTS 4,104,564 A * 8/1978 Cohen et al. ................ 315/171

6,154,086 A * 11/2000 Manolescu ................. 327/419

(Continued)

FOREIGN PATENT DOCUMENTS

JP 10-319069 A 12/1998

(Continued)

OTHER PUBLICATIONS

Chen et al.,"Interconnect and Circuit Modeling Techniques for Full-Chip Power Supply Noise Analysis", Aug. 1998, IEEE Transactions on Connects, Packaging and Manufacturing Technology—Part B, vol. 21, No. 3, pp. 209-215.*

(Continued)

*Primary Examiner*—Sun J Lin
(74) *Attorney, Agent, or Firm*—Sughrue Mion, PLLC

(57) ABSTRACT

Time-axis data that include the peak waveform and the clock frequency of the power supply current when the LSI is switched are inputted to the LSI information input unit, and the LSI equivalent circuit creation unit creates an equivalent circuit of the LSI on the basis of the time-axis data. The time-axis/frequency-axis conversion unit converts the time-axis data to frequency-axis data. The equivalent circuit synthesis unit synthesizes the equivalent circuits of the printed wiring substrate, the power supply regulator, and the LSI to create a single equivalent circuit; the frequency-axis circuit analysis unit performs frequency-axis analysis of the single equivalent circuit; and the frequency-axis/time-axis conversion unit converts the results to time-axis data. The amount of fluctuation of the power supply voltage of an integrated circuit device can thereby be evaluated in a short time.

36 Claims, 22 Drawing Sheets

U.S. PATENT DOCUMENTS

| | | | |
|---|---|---|---|
| 6,545,881 B2* | 4/2003 | Preller | 363/21.01 |
| 7,158,392 B2* | 1/2007 | Hosokawa et al. | 363/21.06 |
| 2004/0052092 A1* | 3/2004 | Hirosawa | 363/13 |
| 2005/0162874 A1* | 7/2005 | Umetsu | 363/37 |

FOREIGN PATENT DOCUMENTS

| | | |
|---|---|---|
| JP | 2001-147952 A | 5/2001 |
| JP | 2001-160084 A | 6/2001 |
| JP | 2002-304434 A | 10/2002 |
| JP | 2004-334654 A | 11/2004 |
| JP | 2005-502226 A | 1/2005 |

OTHER PUBLICATIONS

Jiayuan Fang, "New Methodologies for Signal and Power Integrity Analysis of Electronics Packaging," 16th Annual Meeting of the Japan Institute of Electronics Packaging, 19B-01, pp. 151-152.

Masatoshi Ogawa, et al., "LSA, A New Method of EMI Analysis with Models of LSI at Power Supply Terminals", IEICE Technical Report, Sep. 11, 2000, vol. 100, No. 279, (EMCJ2000 56-64), pp. 7 to 12.

* cited by examiner

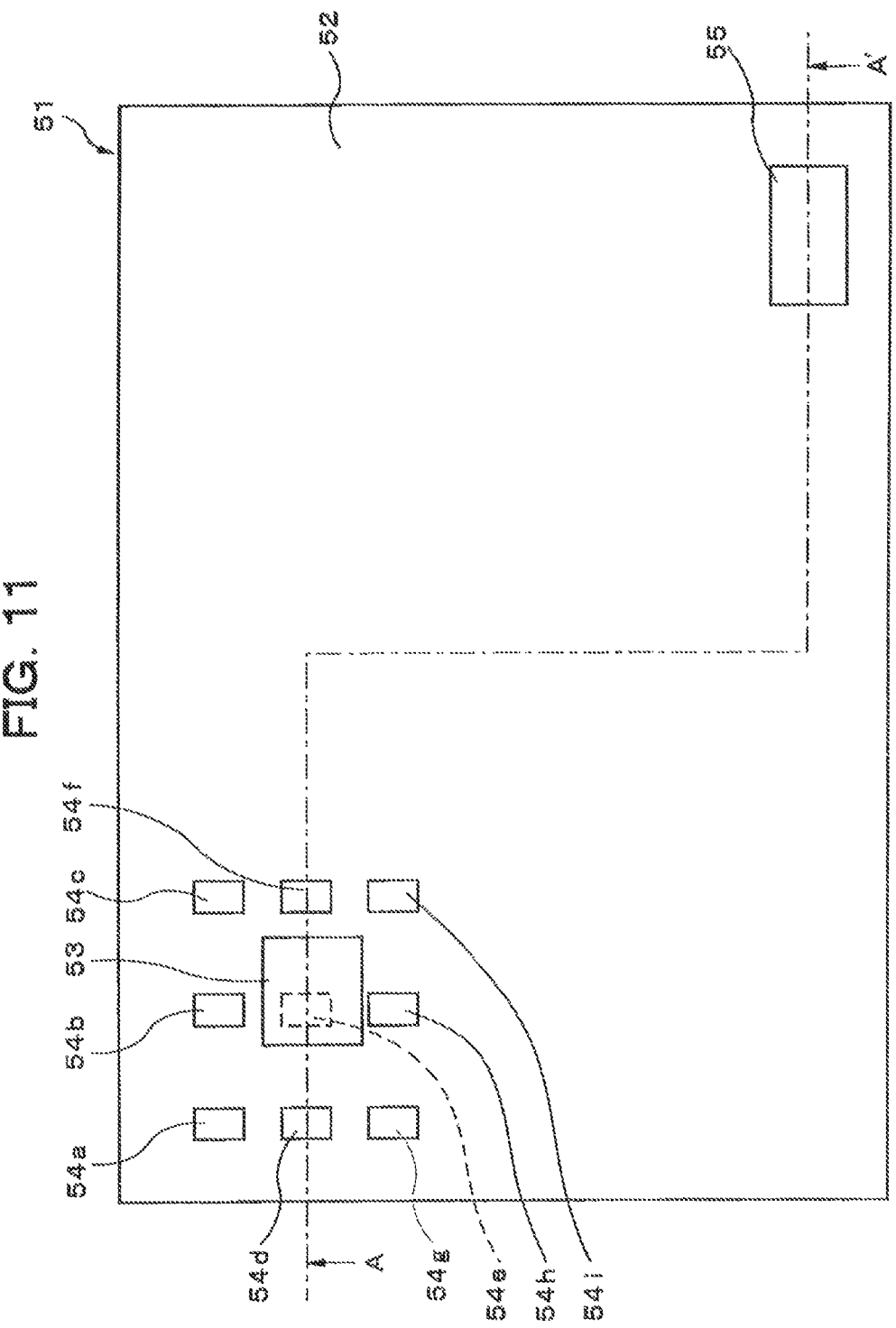

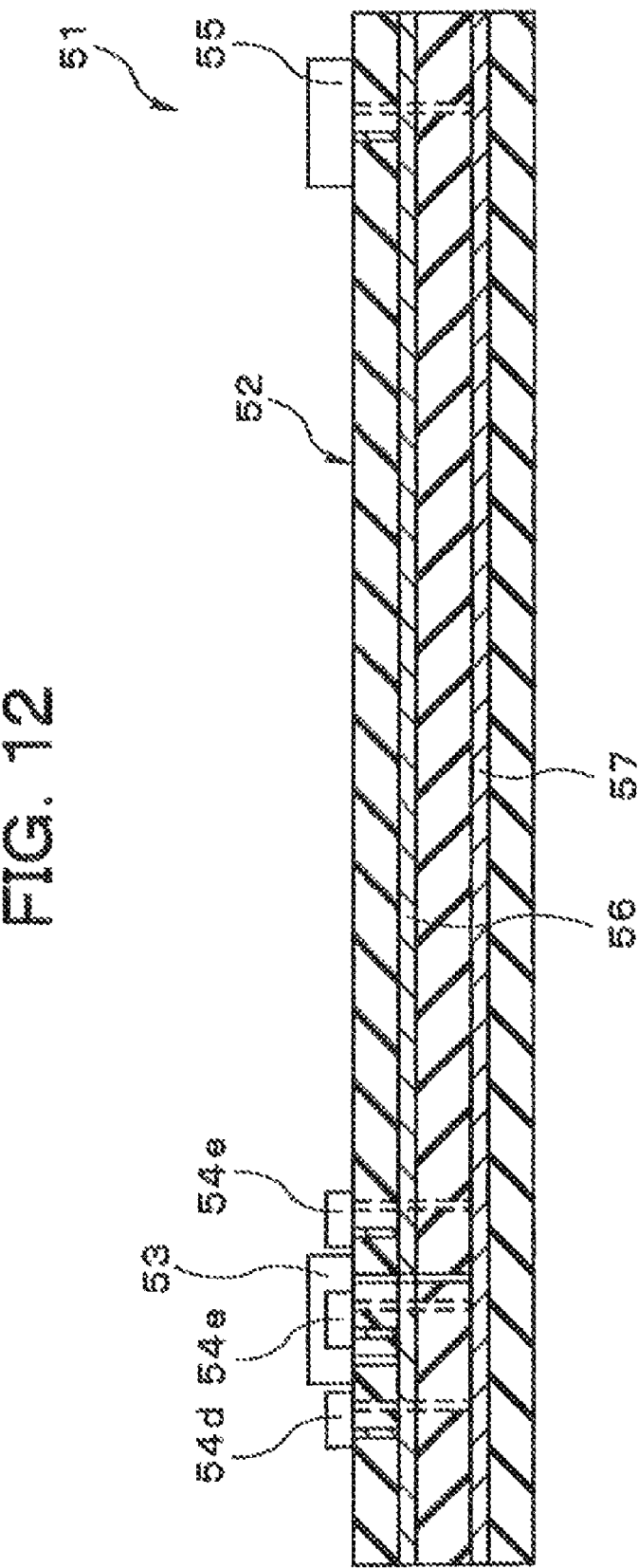

INTEGRATED CIRCUIT DEVICE EVALUATION DEVICE, EVALUATION METHOD, AND EVALUATION PROGRAM

TECHNICAL FIELD

The present invention relates to an evaluation device for evaluating an integrated circuit device in which one or more active circuit elements are mounted on a wiring substrate, to an evaluation method, and to an evaluation program.

BACKGROUND ART

In an integrated circuit device formed by mounting an LSI (Large Scale Integrated circuit) or other active circuit element on a printed wiring board or other wiring substrate, calculations are performed by the transfer of electrical signals between the LSI and the outside, and/or between a plurality of LSIs connected to each other. A direct-current power supply voltage must always be supplied to the LSI in order for such an integrated circuit device to operate.

FIG. 24 is a schematic diagram showing the LSI and the power supply circuit of the printed wiring board in an integrated circuit device. As shown in FIG. 24, power supply wiring 101 and ground wiring 102 are usually provided to the printed wiring board, and an LSI 103 is connected between the wiring units. A power supply regulator 104 is provided for supplying a power supply voltage to the LSI 103 by applying a power supply voltage VCC to the power supply wiring 101 and applying a ground voltage GND to the ground wiring 102. Furthermore, a capacitor 105 is provided in the vicinity of the LSI 103 as a charge supply source in the printed wiring board for instantly supplying a charge to the LSI 103 when the LSI 103 is operating. In the printed wiring board, the power supply circuit is formed by the components relating to the power supply for the LSI 103, i.e., the power supply wiring 101, the ground wiring 102, and the capacitor 103. Besides these elements, an inductor and a filter (not shown) are also sometimes provided to the power supply circuit in order to prevent the expansion of high-frequency noise that is outputted from the power supply.

FIG. 25 is a graph showing the fluctuation of the power supply voltage that occurs when the LSI is switched, wherein time is indicated on the horizontal axis, and the control signal level and the power supply voltage that are supplied to the LSI are indicated on the vertical axis. The switching time is the time at which a control signal level of some kind for controlling the operation of the LSI is switched to switch on operation of the LSI, and the switching time is mostly synchronized with the rising time and the falling time of the clock signal. In the integrated circuit device shown in FIG. 24, the necessary charge is fed mostly from the capacitor 105 when the LSI 103 is switched. However, since the capacitor 105 has a limited capacity, and the drive capability of the power supply regulator 104 is also limited, the power supply voltage fed to the LSI 103 fluctuates as shown in FIG. 25 when a large amount of charge flows from the capacitor 105 to the LSI 103. When the maximum fluctuation $\Delta V$ of this fluctuation is larger than the allowable range of the LSI 103, the LSI 103 malfunctions, and malfunctioning can occur in the entire integrated circuit device.

Recent increases in speed and density of integrated circuit devices, as well as increased complexity of the functions of the electronic devices in which integrated circuit devices are mounted have been accompanied by an increased variety of power supply voltage values for the LSIs that constitute digital circuits, and the amount of charge needed for operation has also increased. In order to satisfy these demands, numerous limitations have been placed on the structure of power supply circuits, and particularly on the power supply wiring and ground wiring of printed wiring boards, and the arrangement of capacitors, inductors, and filters. The design margins in power supply circuits have also become extremely small. As a result, the time needed to design the wiring of power supply circuits has increased, and once the power supply circuit is designed and the integrated circuit device is fabricated, it is often the case that the electrical characteristics required in the integrated circuit device cannot be satisfied and there is no alternative but to redesign the circuit. Problems result in that an extremely long time is taken to design the integrated circuit device.

In order to overcome the problems described above, a technique has been developed for computing the fluctuation $\Delta V$ of the power supply voltage in the design stage of an integrated circuit device. This technique makes it possible to design an integrated circuit device in which the fluctuation of the power supply voltage is within the allowable range without actually fabricating the integrated circuit device, by appropriately computing the fluctuation of the power supply voltage while the integrated circuit device is being designed, and redoing the design when the fluctuation $\Delta V$ exceeds the allowable range. For example, Non-patent Document 1 discloses a technique for computing the fluctuation of the power supply voltage by using a three-dimensional electromagnetic analysis means to simulate the power supply voltage behavior of the integrated circuit device over time.

[Non-patent document 1] Jiayuan Fang, "New Methodologies for Signal and Power Integrity Analysis of Electronics Packaging," $16^{th}$ Annual Meeting of the Japan Institute of Electronics Packaging, 19B-01, pp. 151-152.

DISCLOSURE OF THE INVENTION

Problems the Invention is Intended to Solve

However, the conventional technique described above has such problems as the following. In the technique described in Non-patent Document 1, the fluctuation of the power supply voltage is computed by simulating the operation of the integrated circuit device over time. However, the integrated circuit device is in a transient state for a certain period that begins when the power supply is applied, and the integrated circuit device subsequently enters a steady state. Consequently, in the above-mentioned simulation, the steady state cannot be simulated unless the steady state occurs after the transient state is simulated. Therefore, when the steady state is simulated, about one or two days are generally required for the simulation, depending on the structure of the integrated circuit device being simulated and the performance of the computer used for the simulation. Design of the integrated circuit device therefore cannot be efficiently supported, and the design requires an extremely long time.

The present invention was developed in view of the foregoing problems, and an object of the present invention is to provide an evaluation device for an integrated circuit device whereby the fluctuation of the power supply voltage of the integrated circuit device can be evaluated in a short time, to provide an evaluation method, and to provide an evaluation program.

Means for Solving the Problems

The evaluation device for an integrated circuit device according to the present invention is an evaluation device for an integrated circuit device, for evaluating fluctuation of a power supply voltage in the integrated circuit device. Said evaluation device for an integrated circuit device comprises an equivalent circuit creation unit for creating an equivalent circuit for the integrated circuit device and converting into frequency axis data the power supply behavior at the time of switching in an active circuit element of the integrated circuit device that is inputted as time axis data; an analysis unit for using the frequency axis data to analyze the equivalent circuit in a frequency axis and compute a power supply voltage for each frequency; and a frequency-axis/time-axis conversion unit for converting the frequency axis data that indicate the power supply voltage of each frequency into time-axis data.

The present invention makes it possible to reduce the time required for analysis by analyzing an equivalent circuit of the integrated circuit device in the frequency axis. The power supply behavior at the switching time in the active circuit element is inputted as time-axis data, and the frequency-axis data obtained as a result of analysis are converted to time-axis data. The behavior of the power supply voltage can thereby be handled as time-axis data.

The time axis data that indicate the power supply behavior at the switching time in the active circuit element are preferably a peak waveform of a power supply current at the switching time, and a clock frequency of the active circuit element. The peak waveform and the clock frequency can thereby be inputted independently of each other.

Furthermore, a configuration may be adopted in which the integrated circuit device comprises a wiring substrate, the active circuit element mounted on the wiring substrate, and a power supply regulator for supplying a power supply voltage to the active circuit element via the wiring substrate; and the equivalent circuit creation unit has a wiring substrate equivalent circuit creation unit for creating an equivalent circuit of a power supply circuit for transmitting the power supply voltage in the wiring substrate; a power supply regulator equivalent circuit creation unit for creating an equivalent circuit of the power supply regulator; an active circuit element equivalent circuit creation unit for creating an equivalent circuit of the active circuit element; a time-axis/frequency-axis conversion unit for converting the power supply behavior at the switching time in the active circuit element into frequency-axis data; and an equivalent circuit synthesis unit for synthesizing the equivalent circuit of the power supply circuit, the equivalent circuit of the power supply regulator, and the equivalent circuit of the active circuit element to create an equivalent circuit of the integrated circuit device that includes the frequency-axis data.

At this time, the power supply regulator equivalent circuit creation unit may create the equivalent circuit of the power supply circuit by inputting values of parameters into the equivalent circuit model of the power supply regulator for which the parameter values have not been inputted. The equivalent circuit of the power supply circuit can thereby be easily created.

The active circuit element equivalent circuit creation unit may also create the equivalent circuit of the active circuit element by inputting values of parameters into the equivalent circuit model of the active circuit element for which the parameter values have not been inputted. The equivalent circuit of the active circuit element can thereby be easily created.

At this time, the active circuit element equivalent circuit creation unit preferably selects one model from a plurality of models of the equivalent circuit of the active circuit element according to the active circuit element of the integrated circuit device under evaluation. The equivalent circuit can thereby be precisely created in accordance with the type of active circuit element and the purpose of evaluation.

Furthermore, the wiring substrate equivalent circuit creation unit may create the equivalent circuit of the power supply circuit by inputting values of parameters into the equivalent circuit model of the power supply circuit for which the parameter values have not been inputted.

At this time, the wiring substrate equivalent circuit creation unit preferably has a computing unit for computing values of the parameters on the basis of layout information of the power supply circuit, and CAD (Computer Aided Design) information is preferably inputted as the layout information.

A configuration may be adopted in which the power supply circuit is provided with wiring and a capacitor that is disposed on the wiring, and the evaluation device has a capacitor changing unit for changing at least one of the position and the capacity of the capacitor in the layout information and creating new layout information; a storage unit for storing the fluctuation of the power supply voltage computed on the basis of the new layout information; and a comparison unit for comparing the stored fluctuation of the power supply voltage with a reference value. The position of the capacitor can thereby be automatically determined.

The evaluation method for an integrated circuit device according to the present invention is an evaluation method for an integrated circuit device, for evaluating fluctuation of a power supply voltage in the integrated circuit device, wherein the evaluation method for an integrated circuit device is characterized in comprising an equivalent circuit creation step for creating an equivalent circuit for the integrated circuit device and converting into frequency axis data the power supply behavior at the time of switching in an active circuit element of the integrated circuit device that is inputted as time axis data; an analysis step for using the frequency axis data to analyze the equivalent circuit in a frequency axis and compute a power supply voltage for each frequency; and a frequency-axis/time-axis conversion step for converting the frequency axis data that indicate the power supply voltage of each frequency into time-axis data.

The evaluation program for an integrated circuit device according to the present invention is an evaluation program for an integrated circuit device, for causing a computer to evaluate fluctuation of a power supply voltage in an integrated circuit device, wherein the evaluation program is characterized causing the computer to execute an equivalent circuit creation routine for creating an evaluation circuit for the integrated circuit device and converting into frequency axis data the power supply behavior at the time of switching in an active circuit element of the integrated circuit device that is inputted as time axis data; an analysis routine for using the frequency axis data to analyze the equivalent circuit in a frequency axis and compute a power supply voltage for each frequency; and a frequency-axis/time-axis conversion routine for converting the frequency axis data that indicate the power supply voltage of each frequency into time-axis data.

Another evaluation program for an integrated circuit device according to the present invention is an evaluation program for an integrated circuit device, for causing a computer to evaluate fluctuation of a power supply voltage in an integrated circuit device that is provided with a wiring substrate, an active circuit element mounted on the wiring substrate, and a power supply regulator for supplying a power supply voltage to the active circuit element via the wiring substrate, wherein the evaluation program is characterized in causing the computer to execute a wiring substrate equivalent circuit creation routine for creating an equivalent circuit of a power supply circuit for transmitting the power supply voltage in the wiring substrate; a power supply regulator equivalent circuit creation routine for creating an equivalent circuit of the power supply regulator; an active circuit element equivalent circuit creation routine for creating an equivalent circuit of the active circuit element; a time-axis/frequency-axis conversion routine for converting the peak waveform of the power supply current at the switching time in the active circuit element, and the clock frequency of the active circuit element to frequency-axis data; an equivalent circuit synthesis routine for synthesizing the equivalent circuit of the power supply circuit, the equivalent circuit of the power supply regulator, and the equivalent circuit of the active circuit element to create an equivalent circuit of the integrated circuit device that includes the frequency-axis data; an analysis routine for using the frequency axis data to analyze the equivalent circuit of the integrated circuit device in a frequency axis and compute a power supply voltage for each frequency; and a frequency-axis/time-axis conversion routine for converting the frequency axis data that indicate the power supply voltage of each frequency into time-axis data.

EFFECTS OF THE INVENTION

According to the present invention, the amount of fluctuation of the power supply voltage of an integrated circuit device can be evaluated in a short time by evaluating the integrated circuit device in a frequency axis.

BRIEF DESCRIPTION OF THE DRAWINGS

FIG. 11 is a plan view showing the integrated circuit device under evaluation according to the evaluation method of the present embodiment;

FIG. 12 is a sectional view along line A-A' in FIG. 11;

KEY

Figure 1:
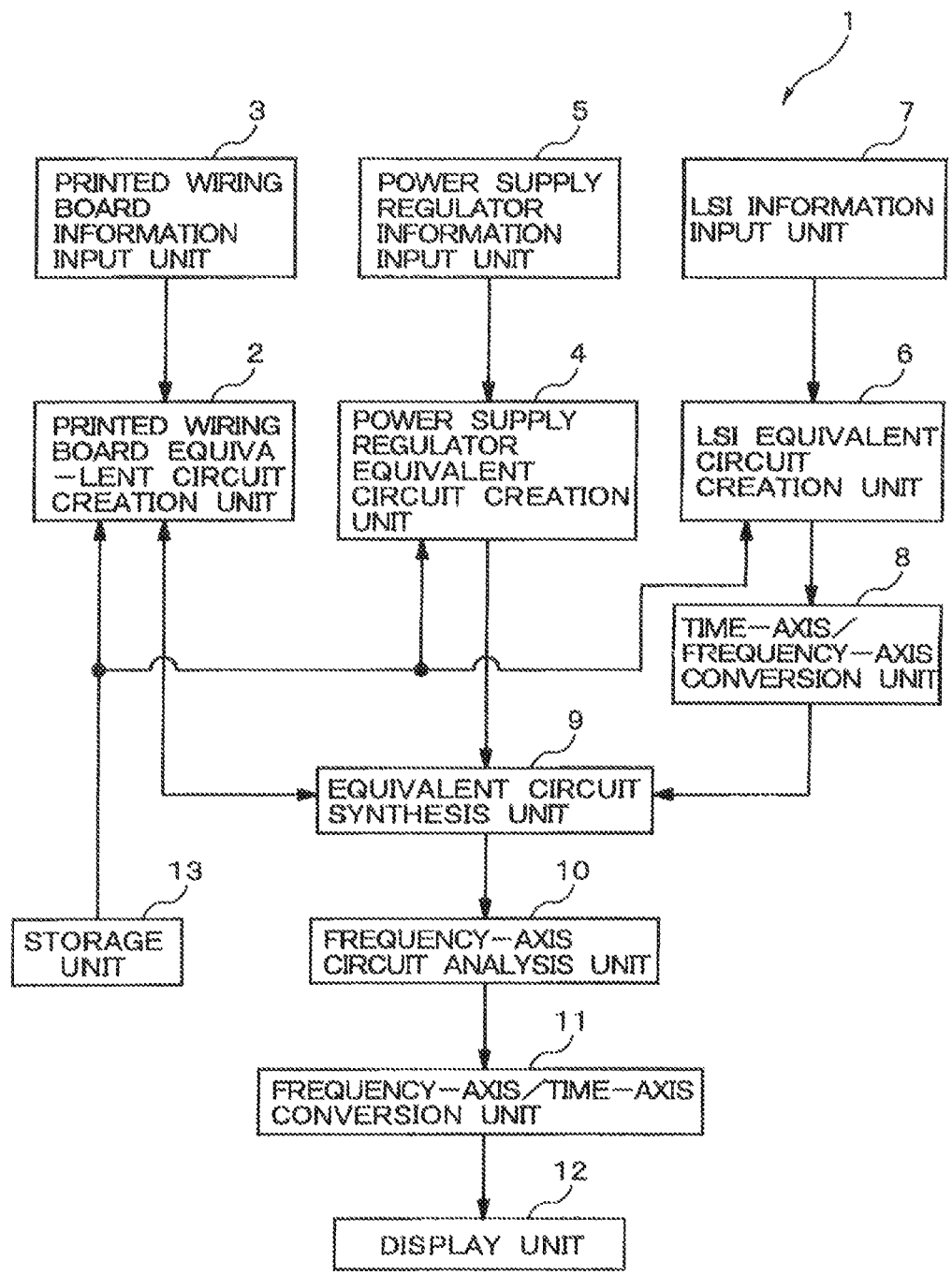
FIG. 1 is a block diagram showing the evaluation device according to Embodiment 1 of the present invention.

1: evaluation device
2: printed wiring board equivalent circuit creation unit
3: printed wiring board information input unit
4: power supply regulator equivalent circuit creation unit
5: power supply regulator information input unit
6: LSI equivalent circuit creation unit
7: LSI information input unit
8: time-axis/frequency-axis conversion unit
9: equivalent circuit synthesis unit
10: frequency-axis circuit analysis unit 11: frequency-axis/time-axis conversion unit
12: display unit
13: storage unit
21: evaluation device
22: CAD information input unit
23: LSI data base storage unit
31: evaluation device
32: capacitor position changing unit
33: storage unit
34: comparison unit
51: integrated circuit device
52: printed wiring board
53: LSI
54a through 54i: decoupling capacitor
55: power supply regulator
56: ground layer
57: power supply layer
101: power supply wiring
102: ground wiring
103: LSI
104: power supply regulator
105: capacitor
EC1 through EC6: equivalent circuit model
P1, P2: passive element

BEST MODE FOR CARRYING OUT THE INVENTION

Figure 2:
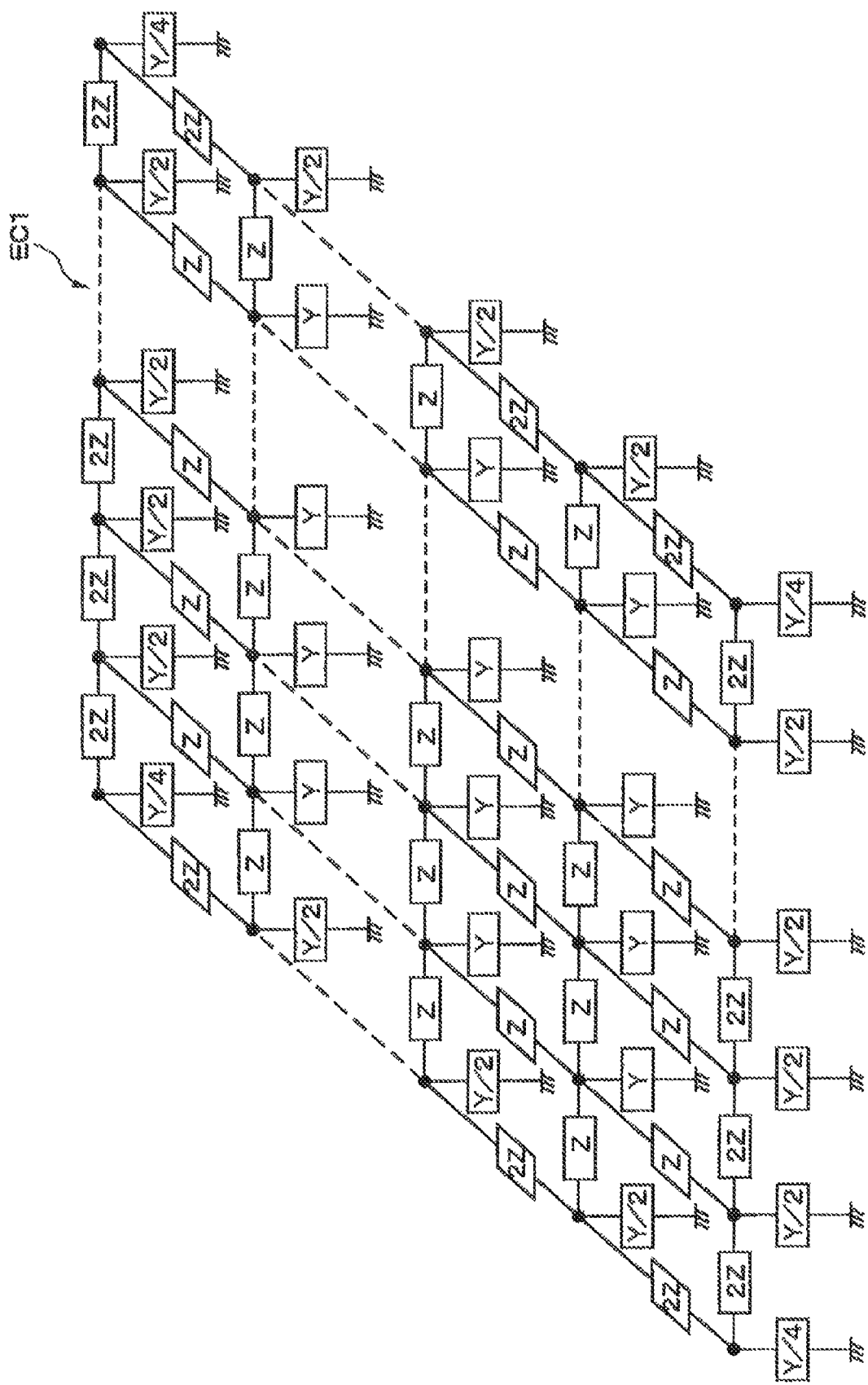
FIG. 2 is a circuit diagram showing an equivalent circuit model that shows the portions other than the decoupling capacitor in the power supply circuit of the printed wiring board.
Figure 3:
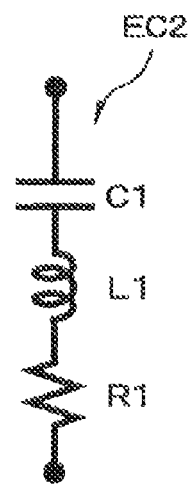
FIG. 3 is a circuit diagram showing the equivalent circuit model that shows the decoupling capacitor in the power supply circuit of the printed wiring board.
Figure 4:
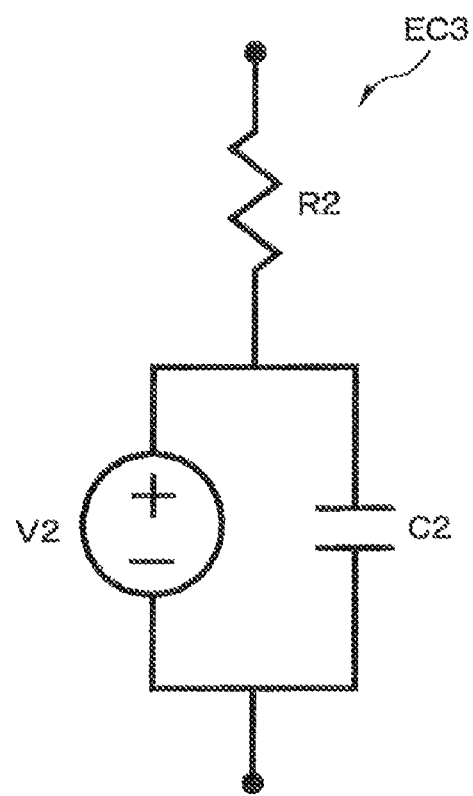
FIG. 4 is a circuit diagram showing the equivalent circuit model of the power supply regulator.
Figure 5:
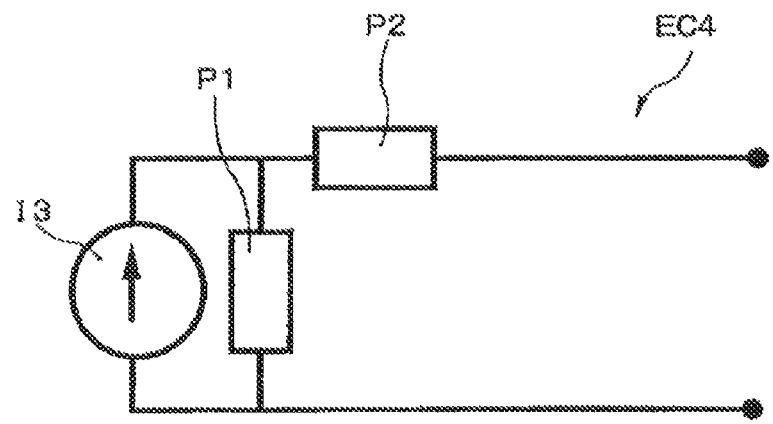
FIG. 5 is a circuit diagram showing a model of the LSI equivalent circuit.
Figure 6:
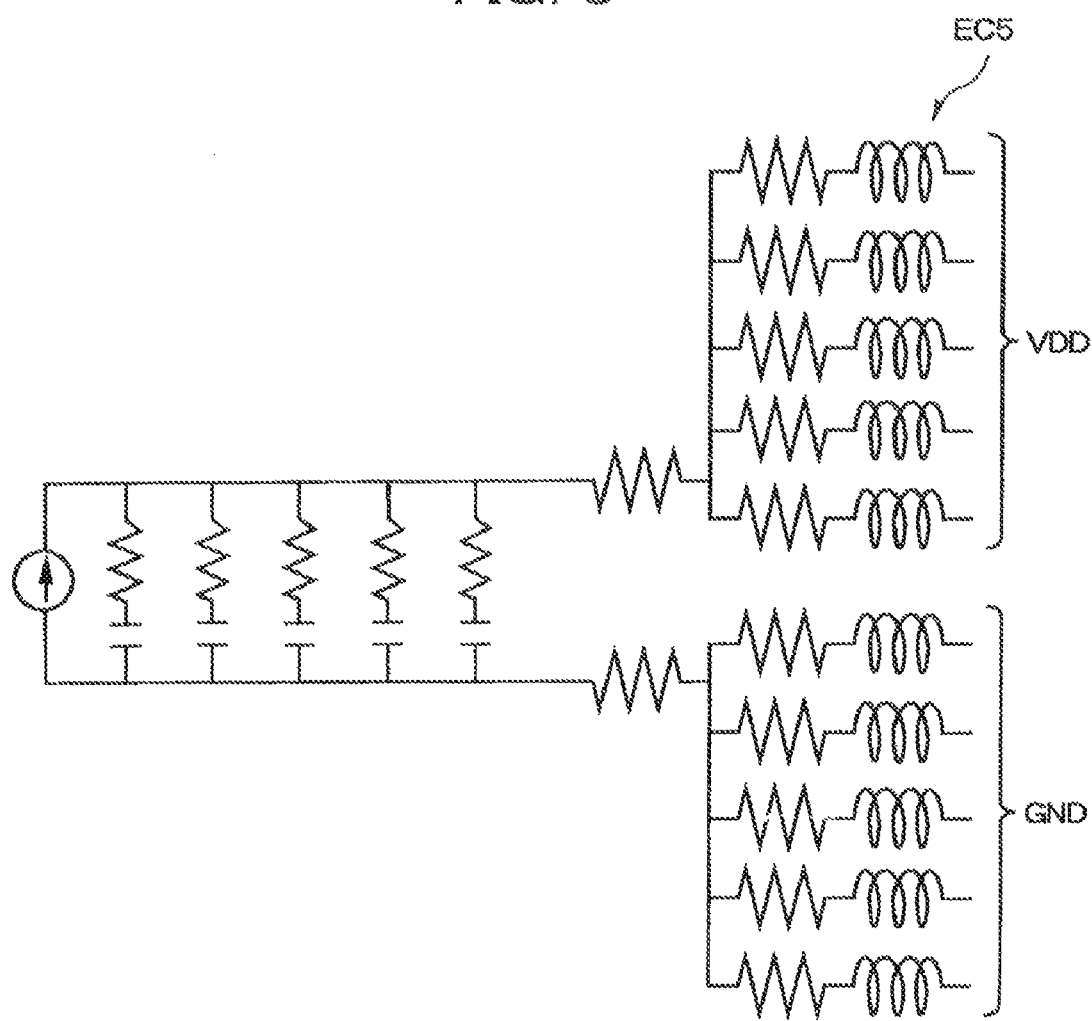
FIG. 6 is a circuit diagram showing model of another equivalent circuit of the LSI.
Figure 7:
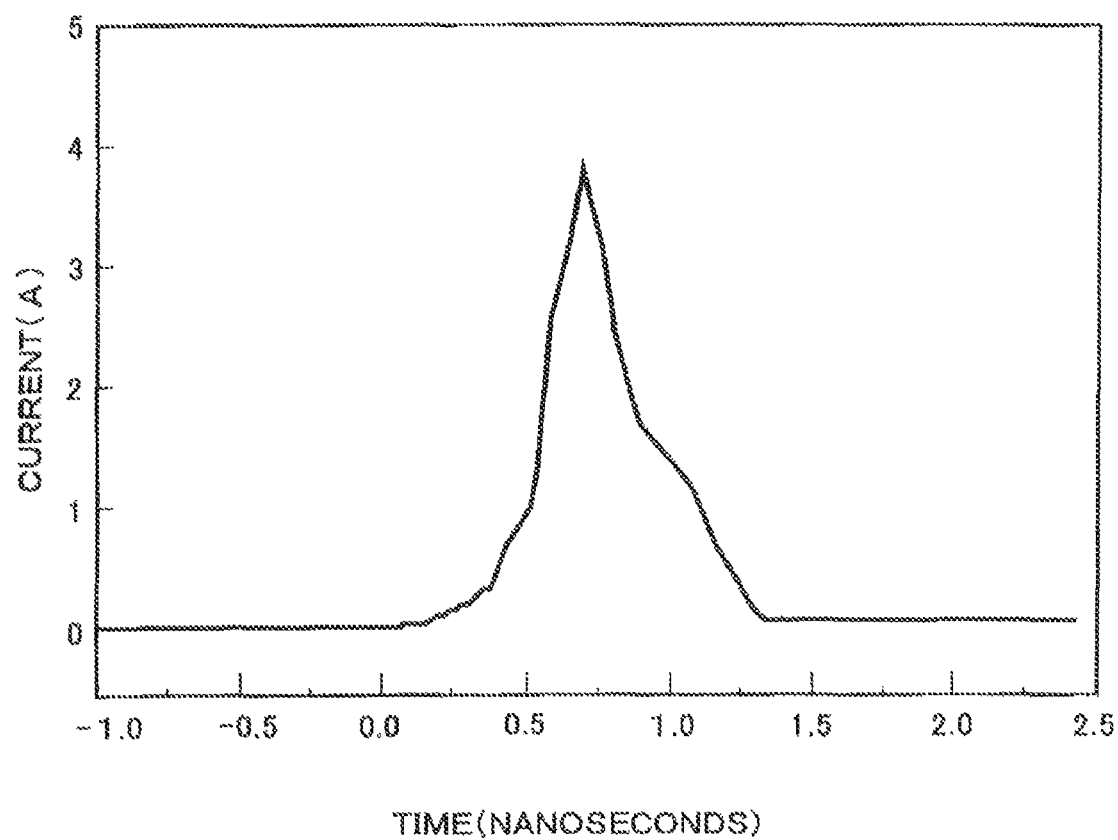
FIG. 7 is a graph showing the time-axis waveform that indicates the current source of the LSI, wherein time is indicated on the horizontal axis, and the current value flowing through the LSI is indicated on the vertical axis.
Figure 8:
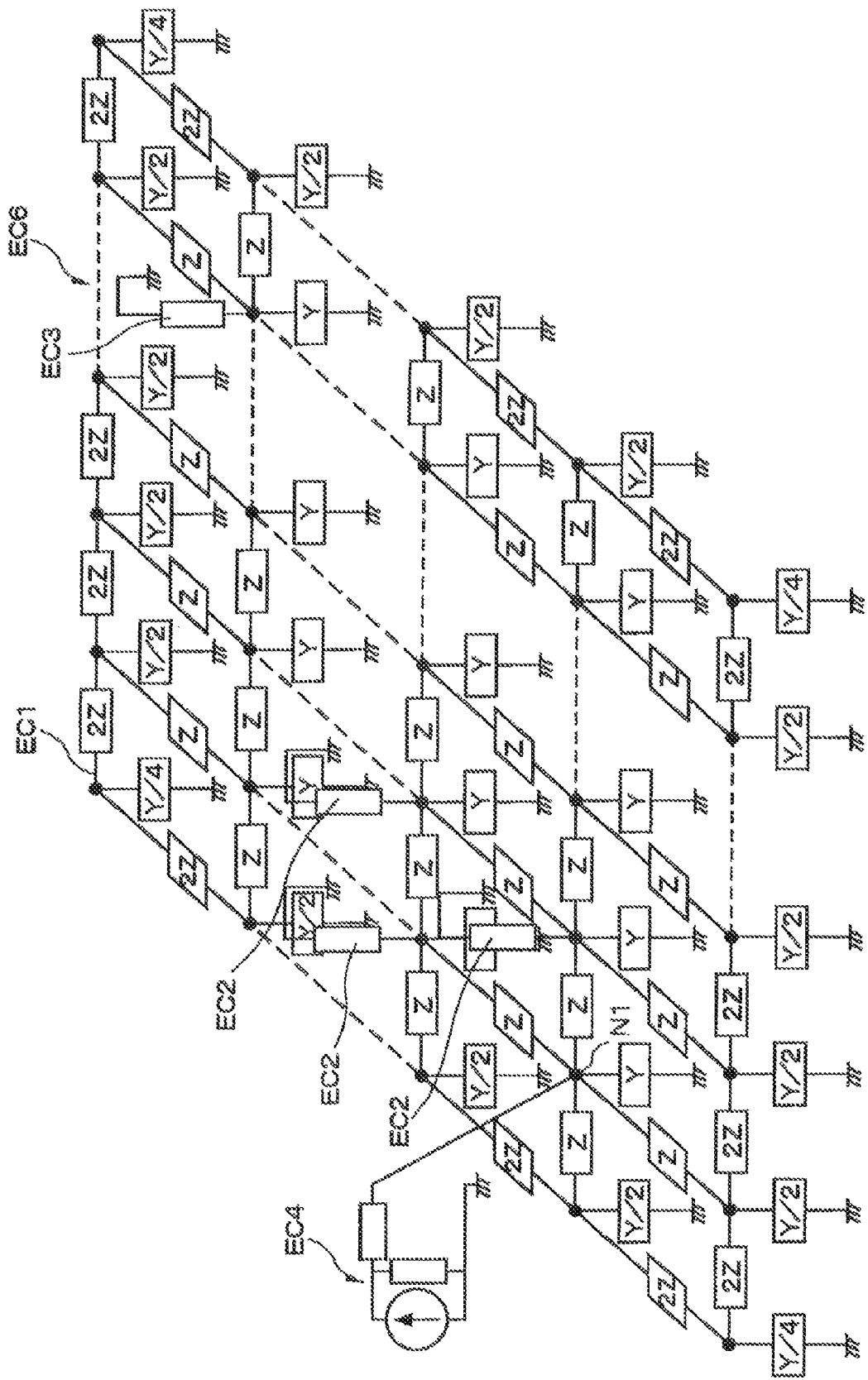
FIG. 8 is a circuit diagram showing the equivalent circuit that indicates the integrated circuit device.

Embodiments of the present invention will be specifically described hereinafter with reference to the accompanying drawings. Embodiment 1 of the present invention will first be described. FIG. 1 is a block diagram showing the evaluation device according to the present embodiment; FIG. 2 is a circuit diagram showing an equivalent circuit model that shows the portions other than the decoupling capacitor in the power supply circuit of the printed wiring board; FIG. 3 is a circuit diagram showing the equivalent circuit model that shows the decoupling capacitor in the power supply circuit of the printed wiring board; FIG. 4 is a circuit diagram showing the equivalent circuit model of the power supply regulator; FIG. 5 is a circuit diagram showing a model of the LSI equivalent circuit; FIG. 6 is a circuit diagram showing model of another equivalent circuit of the LSI; FIG. 7 is a graph showing the time-axis waveform that indicates the current source of the LSI, wherein time is indicated on the horizontal axis, and the current value flowing through the LSI is indicated on the vertical axis; FIG. 8 is a circuit diagram showing the equivalent circuit that indicates the integrated circuit device.

Figure 24:
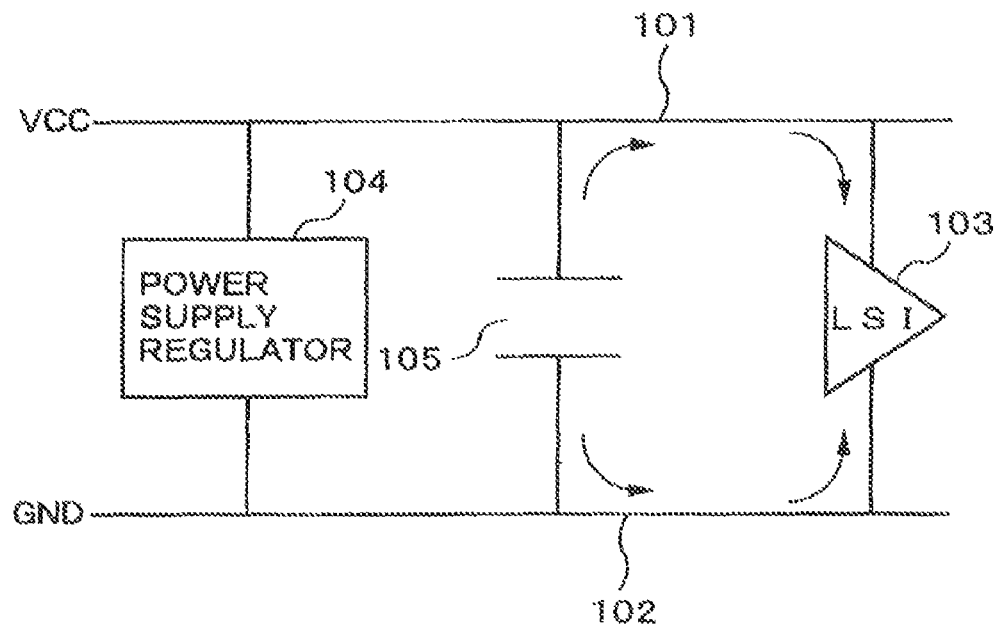
FIG. 24 is a schematic diagram showing the LSI and the power supply circuit of the printed wiring board in an integrated circuit device.
Figure 25:
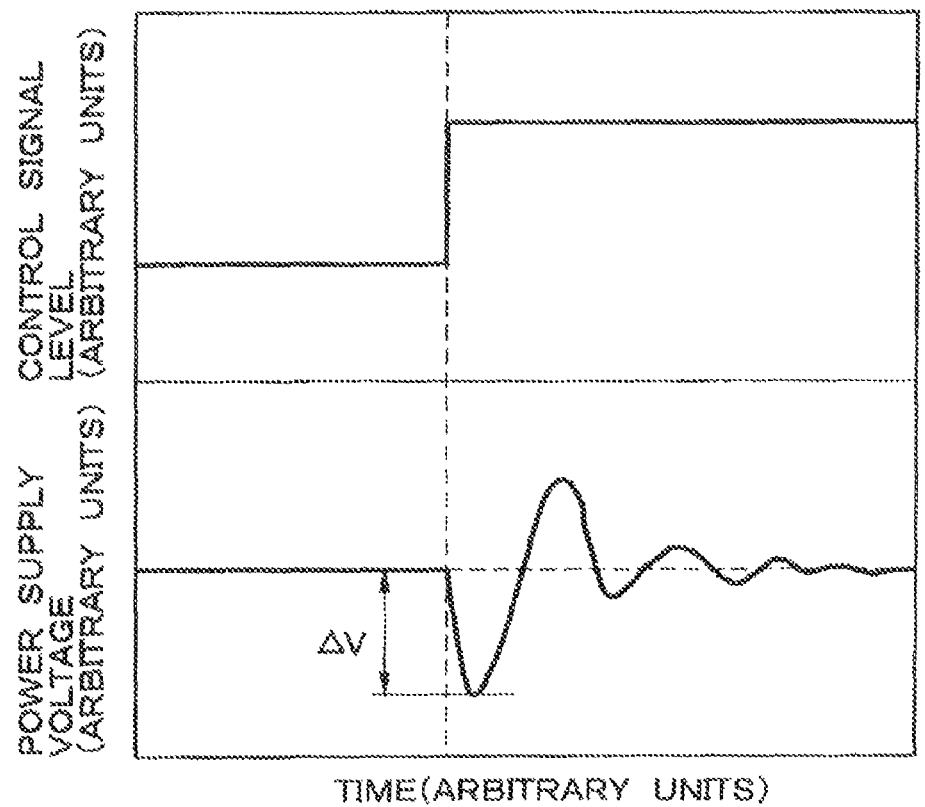
FIG. 25 is a graph showing the fluctuation of the power supply voltage that occurs when the LSI is switched, wherein time is indicated on the horizontal axis, and the control signal level and the power supply voltage that are supplied to the LSI are indicated on the vertical axis.

As shown in FIG. 24, the integrated circuit device under evaluation by the evaluation device of the present embodiment is an integrated circuit device in which an LSI as an active circuit element is mounted on a printed wiring board as a wiring substrate, and a power supply regulator is provided for supplying a power supply voltage to the LSI via a power supply circuit of the printed wiring board. The power supply regulator may be packaged on the printed wiring board, or may be mounted to the printed wiring board externally.

As shown in FIG. 1, a storage unit 13 is provided in the evaluation device 1 of the present embodiment. The storage unit 13 stores an equivalent circuit model EC1 (see FIG. 2) of the power supply circuit of the printed wiring board, an equivalent circuit model EC2 (see FIG. 3) of the decoupling capacitor, an equivalent circuit model EC3 (see FIG. 4) of the power supply regulator, and equivalent circuit models EC4 (see FIG. 5) and EC5 (see FIG. 6) indicating the power supply wiring of the LSI.

In the evaluation device 1, a printed wiring board equivalent circuit creation unit 2 is provided for creating the equivalent circuit of the power supply circuit of the printed wiring board for the integrated circuit device under evaluation. The printed wiring board equivalent circuit creation unit 2 reads the equivalent circuit model EC1 (see FIG. 2) of the power supply circuit that is stored in the storage unit 13. In the equivalent circuit model EC1 shown in FIG. 2, a lattice is formed by a plurality of units of wiring that extend in two directions orthogonal to each other, and a two-dimensional equivalent circuit mesh is formed. The equivalent circuit mesh can be obtained by dividing the principal surface of the printed circuit substrate into a matrix of square micro-regions, and indicating the electrical characteristics of the portions that correspond to the micro-regions of the power supply circuit as parameters. The parameter Y is set as a parameter indicating the resistance and capacitance between the ground voltage and the junctions of the lattice, and the parameter Z is set as a parameter indicating the resistance and inductance between the junctions. The values of the parameters Y and Z are non-inputted and blank.

The printed wiring board equivalent circuit creation unit 2 also reads an equivalent circuit model EC2 of the decoupling capacitor such as the one shown in FIG. 3 from the storage unit 13. A capacitor C1, an inductor L1, and a resistor R1 are series-connected in sequence in the equivalent circuit model EC2. In the equivalent circuit model EC2, the capacitance of the capacitor C1, the inductance of the inductor L1, and the resistance of the resistor R1 are all non-inputted and blank.

The size of the printed wiring board, the dielectric constant e and the loss tan δ of the dielectric material used to form the printed wiring board, the conductor thickness t of each layer, and the distance d between the power supply layer and the ground layer for forming the power supply circuit are inputted as layout information of the printed wiring board to the printed wiring board equivalent circuit creation unit 2. The printed wiring board equivalent circuit creation unit 2 thereby computes parameter Y and parameter Z on the basis of Equations 1 and 2 below. In Equations 1 and 2, $\mu_0$ is the magnetic permeability in a vacuum, $\sigma_c$ is the conductivity of the conductor, f is the frequency, ω is the angular frequency, w is the length in one dimension of the square regions divided into the matrix, and j is an imaginary unit.

$$Y = j\omega\varepsilon\frac{w^2}{d} + \omega\varepsilon\frac{w^2}{d}\tan\delta \quad \text{[Equation 1]}$$

$$Z = 2\sqrt{\frac{\pi f \mu_0}{\sigma_c}}(1+j) + \frac{2}{\sigma_c t} + j\omega\mu_0 d \quad \text{[Equation 2]}$$

The printed wiring board equivalent circuit creation unit 2 creates the equivalent circuit of the power supply circuit of the printed wiring board that corresponds to the numerical data by inputting the values of parameter Y and parameter Z computed using Equation 1 and Equation 2 above into the equivalent circuit model EC1. In the same manner, the equivalent circuit of the decoupling capacitor that corresponds to the numerical data is created by computing the inductance of the inductor L1 and the resistance of the resistor R1 and inputting these values along with the capacitance of the capacitor C1 into the equivalent circuit model EC2. In FIG. 2, parameters Y and Z are indicated by the same reference symbols in each position for the sake of convenience, but individual values are inputted for parameters Y and Z in each position. An individual value is also inputted for each parameter of the decoupling capacitor for each decoupling.

A printed wiring board information input unit 3 is also provided in the evaluation device 1. The printed wiring board information input unit 3 is configured so that the layout information and the numerical value information of the abovementioned printed wiring board are inputted by an operator via a keyboard, for example, and the inputted information is outputted to the printed wiring board equivalent circuit creation unit 2.

A power supply regulator equivalent circuit creation unit 4 for creating the equivalent circuit of the power supply regulator is also provided in the evaluation device 1. The power supply regulator equivalent circuit creation unit 4 reads the equivalent circuit model EC3 (see FIG. 4) of the power supply regulator that is stored in the storage unit 13. In the equivalent circuit model EC3 shown in FIG. 4, a voltage source V2 and a capacitor C2 are connected parallel to each other, and a resistor R2 connected in series to the circuit formed by the voltage source V2 and the capacitor C2. In the equivalent circuit model EC3, the parameters indicating the characteristics of the power supply regulator, i.e., the voltage of the voltage source V2, the capacitance of the capacitor C2, and the resistance of the resistor R2, are all non-inputted and blank. The output voltage, the output current, the ripple voltage, the transient response properties, and other static and dynamic characteristics of the power supply regulator are inputted, whereby the values of the aforementioned parameters are computed, and the equivalent circuit is created.

Furthermore, a power supply regulator information input unit 5 is provided in the evaluation device 1. The power supply regulator information input unit 5 is configured so that the output voltage, output current, ripple voltage, transient response properties, and other static and dynamic characteristics of the power supply regulator are inputted by an operator via a keyboard, for example, and the inputted information is outputted to the power supply regulator equivalent circuit creation unit 4.

Furthermore, an LSI equivalent circuit creation unit 6 for creating the equivalent circuit of the LSI is provided in the evaluation device 1. The LSI equivalent circuit creation unit 6 reads the equivalent circuit model indicating the power supply wiring of the LSI that is stored in the storage unit 13. A plurality of equivalent circuit models indicating the power supply wiring of the LSI is stored in the storage unit 13. For example, the equivalent circuit model EC4 shown in FIG. 5 and the equivalent circuit model EC5 shown in FIG. 6 are stored. In the equivalent circuit model EC4 shown in FIG. 5, a current source I3 is provided between a power supply terminal and a ground terminal, and the current source I3 and a passive element P1 are connected in parallel to each other. A passive element P2 is also connected between the power source terminal and the circuit that is composed of the current source I3 and the passive element P1. The passive element P1 is a parameter that indicates the internal resistance and internal capacitance of the LSI, and the passive element P2 is a parameter that indicates the inductance and resistance of the wiring to which the LSI is connected. These parameters are non-inputted and blank.

A more complex equivalent circuit such as the one shown in FIG. 6 is used to more precisely analyze the LSI. In this case, the precision of analysis is enhanced, but time required for data input and analysis increases. The LSI equivalent circuits shown in FIGS. 5 and 6 are created in advance using an equivalent circuit generation tool (not shown) and stored in the LSI equivalent circuit creation unit 6, but the equivalent circuits created by CAD for use in designing the LSI are incorporated in the form of digital data or submitted from the LSI manufacturer.

The design information of the LSI is inputted to the LSI equivalent circuit creation unit 6, or the LSI is packaged on an evaluation substrate, and the measured values of the voltage and current between terminals are inputted to the LSI equivalent circuit creation unit 6, whereby the LSI equivalent circuit creation unit 6 computes the parameter values of the passive elements P1 and P2. In the inside of the LSI, flowing current is generally concentrated at the switching time of the LSI. Specifically, the current flows in pulses, because a capacitive load in the integrated circuit is charged or discharged when the control signals change from low-level to high-level and high-level to low-level. As shown in FIG. 7, the time-axis waveform of the current flowing at this time is a peaked waveform having a single peak, for example. Therefore, in the equivalent circuit shown in FIG. 5, the current source I3 can be indicated by the two elements that include the clock frequency (operating frequency) and a peak waveform such as the one shown in FIG. 7 that shows the time-axis characteristics of the pulse current at the switching time. The parameter values of the passive elements P1 and P2, and the time-axis waveform and clock frequency of the pulse current at the switching time are inputted to the equivalent circuit model EC4, whereby the LSI equivalent circuit creation unit 6 creates the LSI equivalent circuit.

Furthermore, an LSI information input unit 7 is provided in the evaluation device 1. The LSI information input unit 7 is configured so that the LSI design information, or the values of the voltage and current between terminals, the time-axis waveform (see FIG. 7) indicating the current source I3, the clock frequency, and other information measured by packaging the LSI on an evaluation substrate are inputted by an operator via a keyboard, for example, and the inputted information is outputted to the LSI equivalent circuit creation unit 6.

A time-axis/frequency-axis conversion unit 8 is provided to the evaluation device 1. The LSI equivalent circuit created by the LSI equivalent circuit creation unit 6 is inputted, and the time-axis data that includes the equivalent circuit, i.e., the clock frequency and the time-axis waveform of the switching current that indicate the current source I3, are converted to frequency-axis data by the time-axis/frequency-axis conversion unit 8. Specifically, a time-axis waveform is created in which the time-axis waveform of the switching current is aligned in a period that is the inverse of the clock frequency, and the time-axis waveform is converted to a frequency axis. This conversion is performed by a Fourier transform, e.g., by an FFT (Fast Fourier Transform) in which discrete data are processed by a computer.

An equivalent circuit synthesis unit 9 is also provided to the evaluation device 1. The equivalent circuit model EC1 (see FIG. 2) of the portion other than the decoupling capacitor in the power supply circuit of the printed wiring board, and the equivalent circuit model EC2 (see FIG. 3) of the decoupling capacitor are inputted from the printed wiring board equivalent circuit creation unit 2 to the equivalent circuit synthesis unit 9, the equivalent circuit model EC3 (see FIG. 4) of the power supply regulator is inputted from the power supply regulator equivalent circuit creation unit 4, and the equivalent circuit model EC4 (see FIG. 5) of the LSI in which the time-axis data are converted to frequency-axis data is inputted from the time-axis/frequency-axis conversion unit 8. The equivalent circuit synthesis unit 9 synthesizes the equivalent circuit models EC1 through EC4 to create a single equivalent circuit that represents the power supply circuit of the integrated circuit device. This equivalent circuit can be obtained by electrically connecting the equivalent circuit models EC2 through EC4 that represent the characteristics of the decoupling capacitor, the power supply regulator, and the LSI to junctions that correspond to the positions at which the decoupling capacitor, the power supply regulator, and the LSI are disposed among the junctions of the two-dimensional equivalent circuit mesh EC1 that represents the characteristics of the power supply circuit of the printed wiring board. An example of the synthesized equivalent circuit is shown in FIG. 8.

As shown in FIG. 8, in the synthesized equivalent circuit EC6, the power supply element of the equivalent circuit model EC4 that represents the LSI is connected to one junction N1 of the lattice of the equivalent circuit EC1 that represents the power supply circuit of the printed wiring board, and a ground voltage is applied to the ground terminal of the equivalent circuit EC4. One terminal of the equivalent circuit EC2 representing a decoupling capacitor is connected to several of the junctions in the vicinity of the junction N1, and a ground voltage is applied to the other terminal of the equivalent circuit EC2. In order to simplify the drawing, only three equivalent circuits EC2 are shown in FIG. 8. One terminal of the equivalent circuit EC3 representing the power supply regulator is connected to the other junction of the equivalent circuit EC1, and the ground voltage is applied to the other terminal of the equivalent circuit EC3.

A frequency-axis circuit analysis unit 10 is also provided to the evaluation device 1. The equivalent circuit EC6 synthesized by the equivalent circuit synthesis unit 9 is inputted to the frequency-axis circuit analysis unit 10, and the frequency-axis circuit analysis unit 10 analyzes the equivalent circuit EC6 in the frequency axis to compute the voltage for each frequency in the junctions of the equivalent circuit EC6. The frequency-axis circuit analysis unit 10 is composed of a circuit simulator, for example, and is formed by a SPICE (Simulation Program with Integrated Circuit Emphasis). The circuit simulator is a type of program in which a current source or a voltage source is connected to a circuit mesh represented by a combination of equivalent circuits, whereby the voltages in a high-frequency steady state of the junctions of the circuit mesh are computed for each specified frequency. The operating frequency and the high-frequency component thereof that are inputted in the LSI information input unit 7, for example, are specified as the aforementioned frequency.

Furthermore, the evaluation device 1 is provided with a frequency-axis/time-axis conversion unit 11 for converting the frequency-axis data computed by the frequency-axis circuit analysis unit 10, i.e., the data indicating the voltage for each frequency in the junctions of the equivalent circuit EC6, to time-axis data. The frequency-axis/time-axis conversion unit 11 performs the aforementioned conversion by an inverse Fourier transform, or by computing the sum of the sine waveforms for the frequencies.

A display unit 12 is also provided to the evaluation device 1. The display unit 12 is a monitor or the like, for example. The display unit 12 displays the time-axis data that are converted by the frequency-axis/time-axis conversion unit 11.

Figure 9:
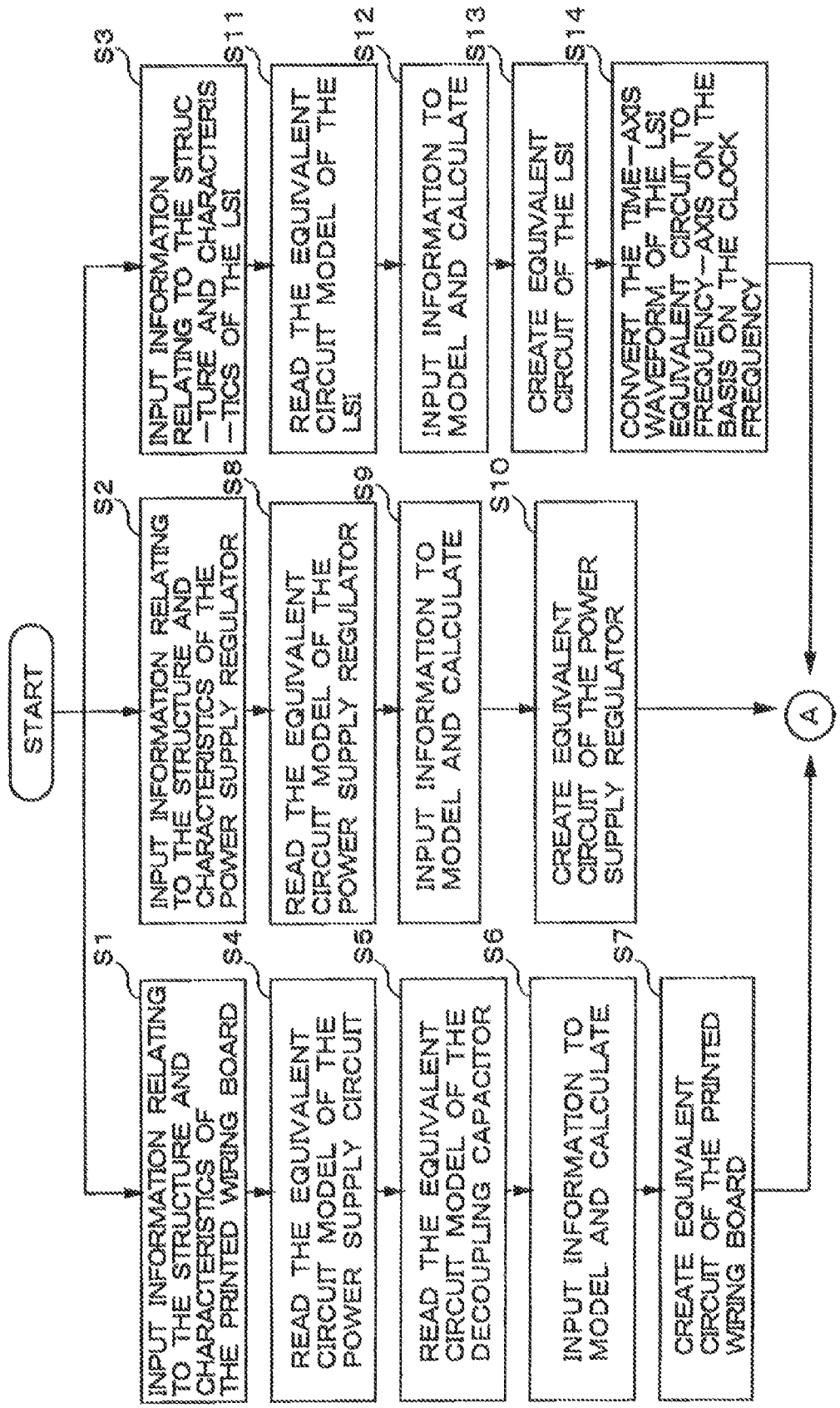
FIG. 9 is a flowchart showing the evaluation method for an integrated circuit device according to the present embodiment.
Figure 10:
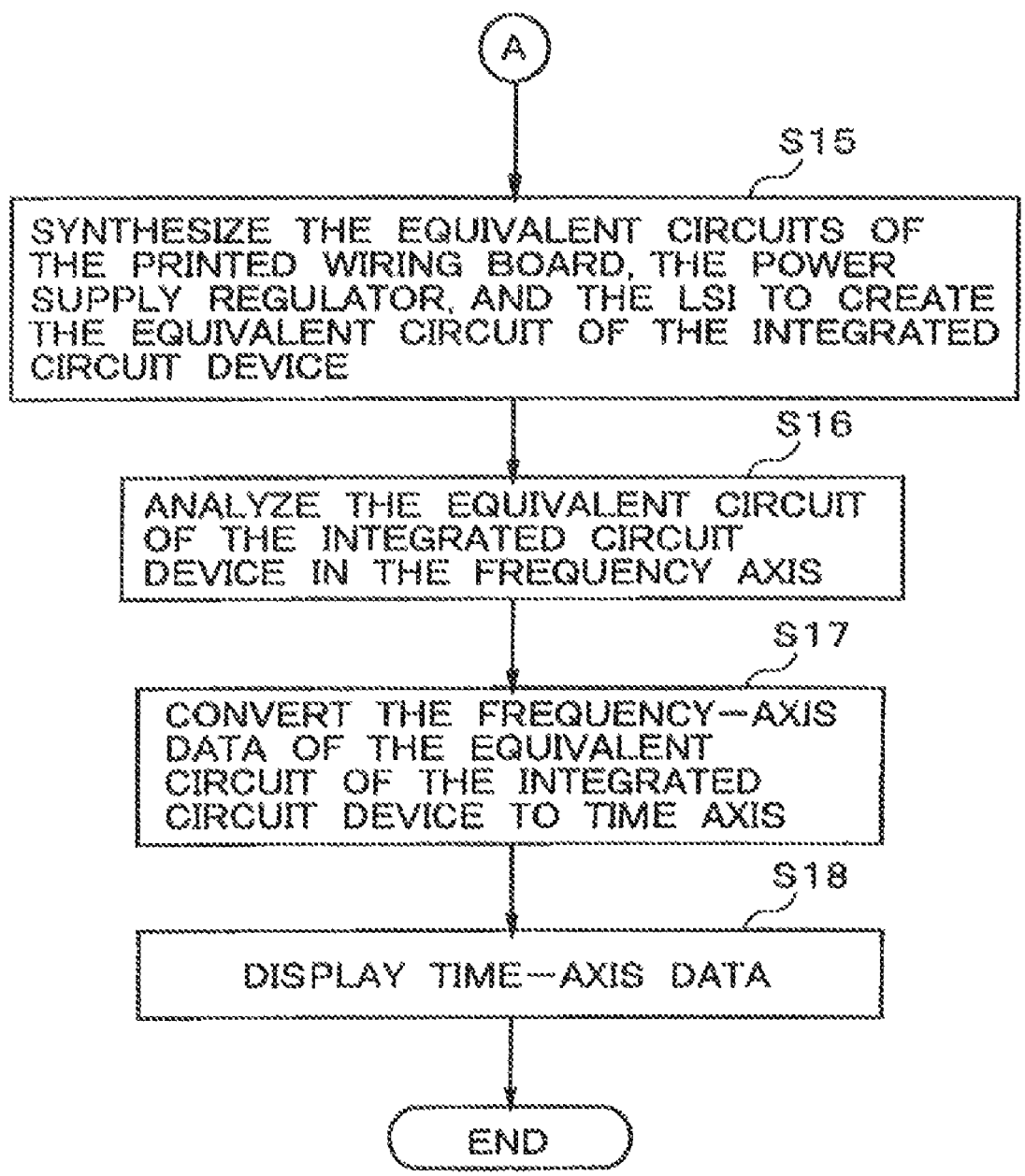
FIG. 10 is a flowchart showing the evaluation method for an integrated circuit device according to the present embodiment, wherein the steps subsequent to FIG. 9 are shown.
Figure 13A:
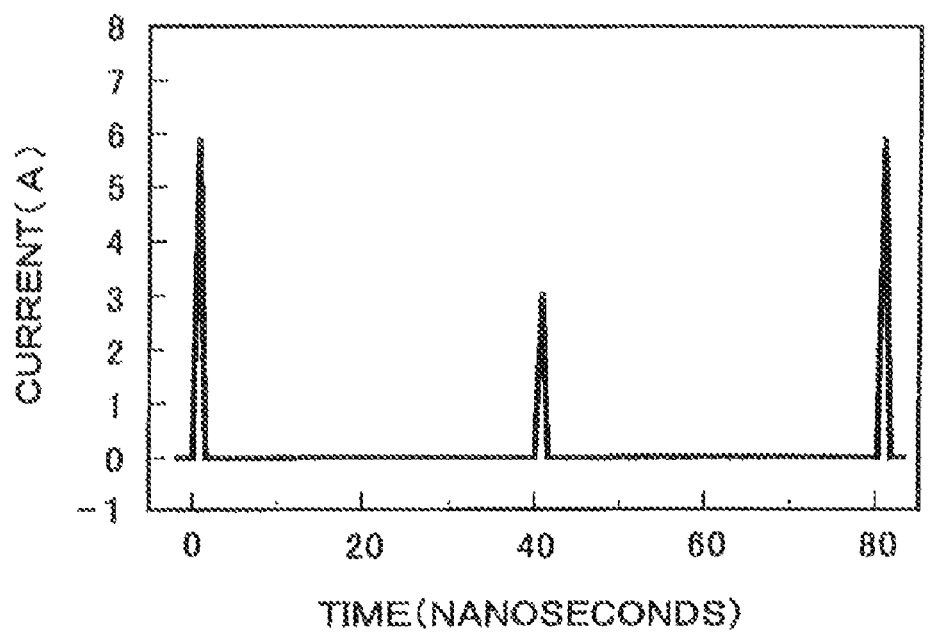
FIG. 13A is a graph showing the time-axis data of the current flowing in the LSI, wherein time is indicated on the horizontal axis, and the current value is indicated on the vertical axis.
Figure 13B:
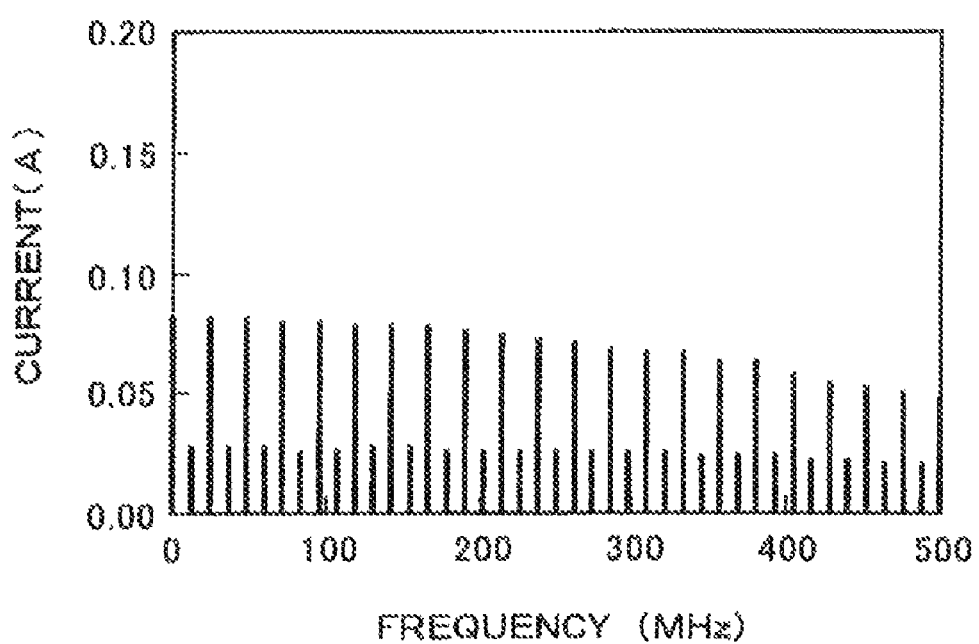
FIG. 13B is a graph showing the frequency-axis data of the current flowing in the LSI, wherein the frequency is indicated on the horizontal axis, and the current value is indicated on the vertical axis.
Figure 14:
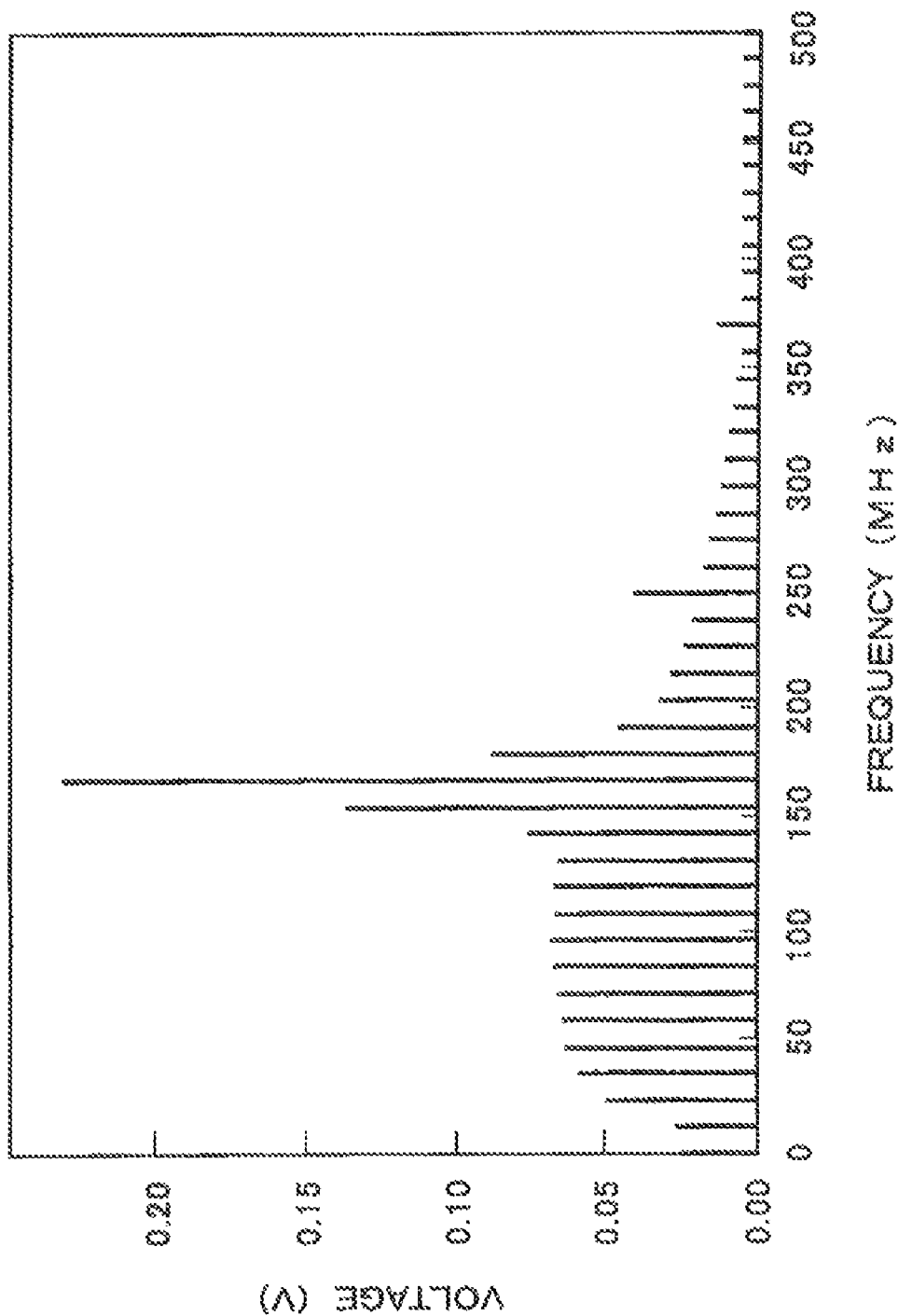
FIG. 14 is a graph showing the frequency-axis data of the power supply voltage of the portion of the integrated circuit device in which the LSI is mounted, wherein the frequency is indicated on the horizontal axis, and the power supply voltage is indicated on the vertical axis.
Figure 15:
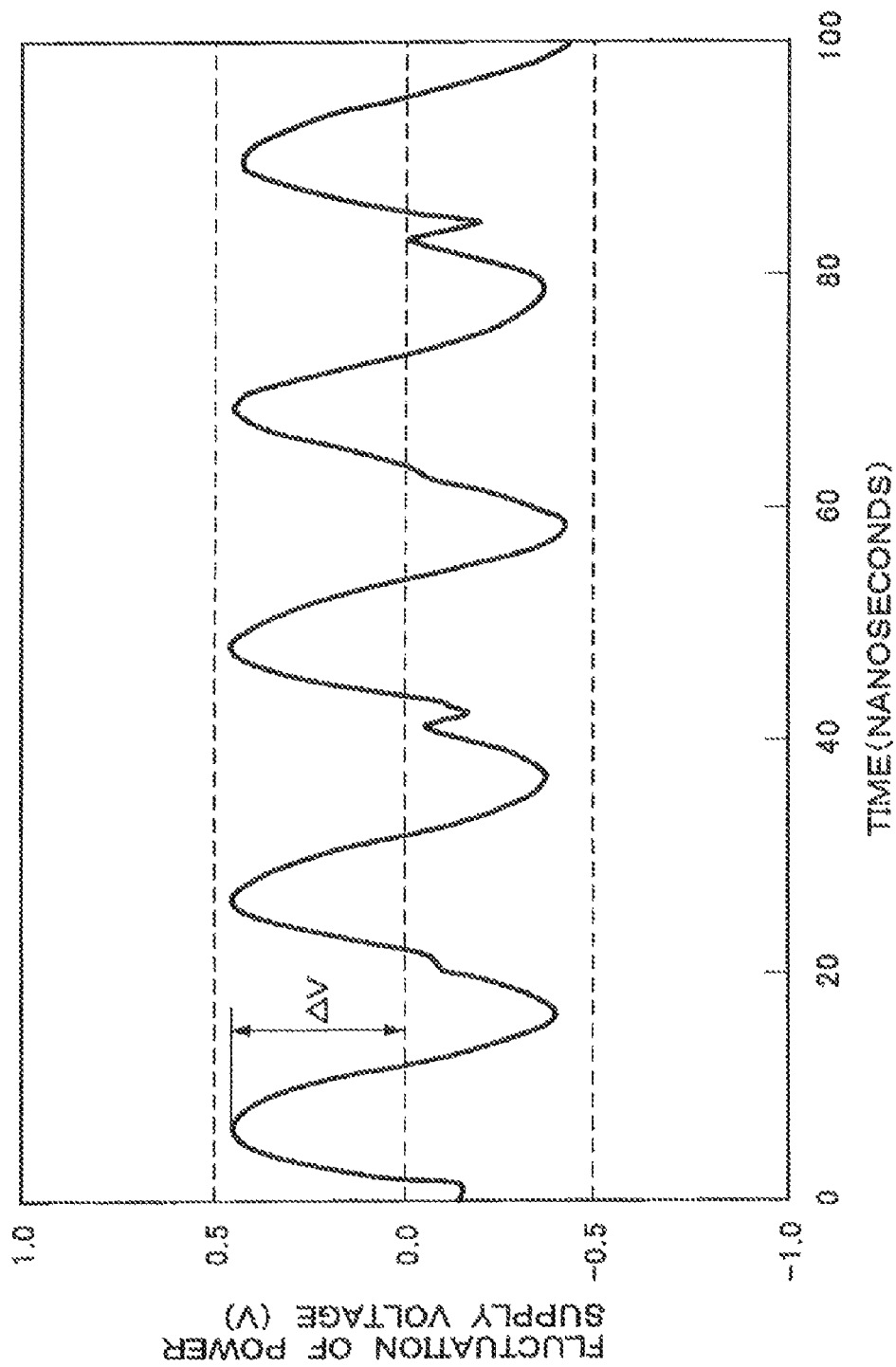
FIG. 15 is a graph showing the time-axis data of the power supply voltage at the position of the integrated circuit device, wherein time is indicated on the horizontal axis, and the fluctuation of the power supply voltage is indicated on the vertical axis.

Following is a description of the operation of the evaluation device for an integrated circuit device according to the present embodiment thus configured, i.e., the evaluation method for an integrated circuit device according to the present embodiment. FIGS. 9 and 10 are flowcharts showing the evaluation method for an integrated circuit device according to the present embodiment. FIG. 11 is a plan view showing the integrated circuit device under evaluation according to the evaluation method of the present embodiment; and FIG. 12 is a sectional view along line A-A' in FIG. 11. FIG. 13A is a graph showing the time-axis data of the current flowing in the LSI, wherein time is indicated on the horizontal axis, and the current value is indicated on the vertical axis; and FIG. 13B is a graph showing the frequency-axis data of the current flowing in the LSI, wherein the frequency is indicated on the horizontal axis, and the current value is indicated on the vertical axis. FIG. 14 is a graph showing the frequency-axis data of the power supply voltage of the portion of the integrated circuit device in which the LSI is mounted, wherein the frequency is indicated on the horizontal axis, and the power supply voltage is indicated on the vertical axis. FIG. 15 is a graph showing the time-axis data of the power supply voltage at the position of the integrated circuit device, wherein time is indicated on the horizontal axis, and the fluctuation of the power supply voltage is indicated on the vertical axis. The set value for the power supply voltage is 0 (V), and the vertical axis of FIG. 15 shows the amount of fluctuation from the set value.

As shown in FIG. 11, a printed wiring board 52 is provided in the integrated circuit device 51 under evaluation. The printed wiring board 52 is in the shape of a rectangle in which the length in the longitudinal direction is 300 mm, and the length in the transverse direction is 200 mm. An LSI 53 is disposed near one corner on the printed wiring board 52. The LSI 53 is a QFP (Quad Flat Package) LSI in which pins are provided to the four sides thereof, and the pin count is 208.

A single decoupling capacitor 54e is provided between the printed wiring board 52 and the LSI 53, and eight decoupling capacitors 54a through 54d, and 54f through 54i are provided to the periphery of the LSI 53 on the printed wiring board 52. The total of nine decoupling capacitors 54a through 54i are arranged in a (3×3) matrix. The capacitance of each of the decoupling capacitors 54a through 54i is 0.01 µF, for example. Furthermore, a power supply regulator 55 is provided in the corner opposite the corner at which the LSI 53 is disposed on the printed wiring board 52.

Signal wiring (not shown) for inputting and outputting signals for the LSI, auxiliary circuits (not shown) for controlling the LSI 53, and other components are also provided on the printed wiring board 52, but the present embodiment is for evaluating the power supply circuit of the integrated circuit device, and since the above-mentioned signal wiring, auxiliary circuits, and other constituent elements are not under evaluation in the present embodiment, these components are not shown or described.

As shown in FIG. 12, the printed wiring board 52 has a four-layer structure in which the LSI 53, the decoupling capacitors 54a through 54i, and the power supply regulator 55 are packaged on a first layer, i.e., on the upper surface of the printed wiring board 52. The abovementioned signal wiring and auxiliary circuits are also packaged in the first layer. The entire second layer is a ground layer 56 in a single sheet, and the ground voltage GND is applied to the second layer. The entire third layer is a power supply layer 57 in a single sheet, and the power supply voltage VCC is applied to the third layer. The LSI 53, the decoupling capacitors 54a through 54i, and the power supply regulator 55 are each connected to both the ground layer 56 and the power supply layer 57 via through holes. Nothing is packaged in the fourth layer, i.e., on the lower surface of the printed wiring board 52. A dielectric layer is provided between each layer, the thickness of the dielectric layer between the second and third layers is 1 mm, for example, and the specific inductive capacity of the dielectric material that forms the dielectric layer is 4.4, for example.

A specific data example will be used to describe the evaluation method of the present embodiment in detail. First, the equivalent circuit models EC1 (see FIG. 2) and EC2 (see FIG.

3) that represent the printed circuit board, and the equivalent circuit model EC3 (see FIG. 4) of the power supply regulator are stored in advance in the storage unit 13. The equivalent circuit models are directly inputted as digital data, or equivalent circuits supplied by the manufacturer of the voltage regulator are manually inputted via a keyboard.

A plurality of equivalent circuit models representing the power supply wiring of the LSI is stored in advance in the storage unit 13. Specifically, the equivalent circuit model EC4 shown in FIG. 5, and the equivalent circuit model EC5 shown in FIG. 6 are stored in advance. The equivalent circuit models EC4 and EC5 are created using an equivalent circuit generation tool (not shown), for example, or equivalent circuits created by CAD for use in designing the LSI are incorporated in the form of digital data or submitted from the LSI manufacturer. The numerical values of the parameters in the equivalent circuit models EC1 through EC5 are non-inputted.

As shown in step S1 in FIG. 9, an operator operates a keyboard, for example, whereby the layout information and numerical value information of the printed wiring board are inputted to the printed wiring board information input unit 3. The layout information inputted at this time is arrangement information for the layers of the integrated circuit device 51 shown in FIGS. 11 and 12, and the information includes the shape of the power supply layer and ground layer provided to the printed wiring board, the distance between the layers, and the position information of the decoupling capacitors. The numerical value information includes the dielectric constant of the dielectric that forms the dielectric layer, and the capacitance of the capacitor C. The printed wiring board information input unit 3 outputs the inputted information to the printed wiring board equivalent circuit creation unit 2.

As shown in step S2, an operator operates a keyboard, for example, whereby the output voltage, the output current, the ripple voltage, the transient response properties, and other static and dynamic characteristics of the power supply regulator are inputted to the power supply regulator information input unit 5. The power supply regulator information input unit 5 outputs the inputted information to the power supply regulator equivalent circuit creation unit 4.

As shown in step S3, an operator operates a keyboard, for example, whereby a single equivalent circuit model is selected according to the type of LSI under evaluation and the purpose of the evaluation from among a plurality of equivalent circuit models representing the LSI that is stored in the storage unit 13. The equivalent circuit model EC4, for example, is selected in the present embodiment. The LSI design information, or the values of the voltage and current between terminals, the time-axis waveform (see FIG. 7) of the pulse current during switching that indicates the current source I3, the clock frequency, and other information measured by packaging the LSI on an evaluation substrate are inputted to the LSI information input unit 7. This inputting is performed using a keyboard in a circuit description format for use in a circuit simulator, or by creating a reference format and inputting prescribed numerical values and the like using a keyboard, a mouse, and the like in input fields of a display screen that is created in advance. The LSI information input unit 7 outputs the inputted information to the LSI equivalent circuit creation unit 6. The steps S1 through S3 described above are in random order, and any of the steps may be executed first.

When the information relating to the printed wiring board is inputted to the printed wiring board equivalent circuit creation unit 2 in step S1, the printed wiring board equivalent circuit creation unit 2 reads the equivalent circuit model EC1 (see FIG. 2) of the power supply circuit stored in the storage unit 13, as shown in step S4, and the equivalent circuit model EC2 (see FIG. 3) of the decoupling capacitor that is stored in the storage unit 13 is then read, as shown in step S5. Then, as shown in step S6, the format for representing electromagnetic waves that are propagated between the power supply layer and the ground layer is converted to a format that is capable of representing in a circuit of current and voltage that can be analyzed using an equivalent circuit, and the parameters in the equivalent circuit models EC1 (see FIG. 2) and EC2 (see FIG. 3), i.e., the parameters Y and Z, the inductance of the inductor L1, and the resistance of the resistor R1, are calculated, and the parameters are inputted to the equivalent circuit models EC1 and EC2. The equivalent circuit of the power supply circuit of the printed wiring board that is in accordance with the numerical data is thereby created, as shown in step S7. This equivalent circuit is outputted to the equivalent circuit synthesis unit 9.

In step S2, when the information relating to the power supply regulator is inputted to the power supply regulator equivalent circuit creation unit 4, the power supply regulator equivalent circuit creation unit 4 reads the equivalent circuit EC3 (see FIG. 4) of the power supply regulator that is stored in the storage unit 13, as shown in step S8. Then, as shown in step S9, the parameters of the model EC3, i.e., the voltage of the voltage source V2, the capacitance of the capacitor C2, and the resistance of the resistor R2, are computed and inputted to the model EC3. The equivalent circuit of the power supply regulator that is in accordance with the numerical data is thereby generated, as shown in step S10. This equivalent circuit is outputted to the equivalent circuit synthesis unit 9.

In step S3, when the information relating to the LSI is inputted to the LSI equivalent circuit creation unit 6, the LSI equivalent circuit creation unit 6 reads the selected equivalent circuit model, e.g., the equivalent circuit model EC4 shown in FIG. 5, from the storage unit 13, as shown in step S11. As shown in step S12, the values of the parameters in the model EC4 are computed. Specifically, the parameter values of the passive elements P1 and P2 are computed from the LSI design information, or from the voltage and current between terminals that are measured by packaging the LSI on an evaluation substrate. The parameters indicating the current source I3 are computed from the time-axis waveform and clock frequency shown in FIG. 7. The equivalent circuit of the LSI that is in accordance with the numerical data is thereby generated, as shown in step S13. This equivalent circuit is outputted to the time-axis/frequency-axis conversion unit 8.

As shown in step S14, the time-axis/frequency-axis conversion unit 8 then converts the time-axis data in which the inputted equivalent circuit is included, i.e., the data that include the time-axis waveform and the clock frequency that indicate the current source I3, to frequency-axis data. This conversion is performed by a Fourier transform, e.g., an FFT. At this time, the time-axis data of the LSI show peaks at constant time intervals, as shown in FIG. 13A. Converting the time-axis data to frequency-axis data produces such data as are shown in FIG. 13B. The LSI equivalent circuit that includes the frequency-axis data is then outputted to the equivalent circuit synthesis unit 9. The processes shown in steps S4 through S7, the processes shown in steps S8 through S10, and the processes shown in steps S11 through S13 are in random order and may be executed in any order, or may be executed in parallel. However, step S14 must be executed after step S13.

After steps S4 through S14 are completed, the process proceeds to step S15 shown in FIG. 10, and the equivalent circuit synthesis unit 9 synthesizes the equivalent circuit EC1 (see FIG. 2) and the equivalent circuit EC2 (see FIG. 3) of the printed wiring board inputted from the printed wiring board equivalent circuit creation unit 2, the equivalent circuit EC3 (see FIG. 4) of the power supply regulator inputted from the power supply regulator equivalent circuit creation unit 4, and the equivalent circuit EC4 (see FIG. 5) of the LSI that includes the frequency-axis data inputted from the time-axis/frequency-axis conversion unit 8, and creates a single equivalent circuit EC6 (see FIG. 8) that represents the power supply circuit of the integrated circuit device. At this time, the layout information inputted in step S1 includes arrangement information of the power supply regulator, the LSI, and other components, and the equivalent circuits are synthesized based on this arrangement information. The equivalent circuit EC6 is outputted to the frequency-axis circuit analysis unit 10.

The frequency-axis circuit analysis unit 10 then analyzes the equivalent circuit EC6 in the frequency axis and computes the voltage for each frequency in the junctions of the equivalent circuit EC6, as shown in step S16. The frequency-axis data of the power supply voltage of the junction N1 at which the LSI 53 in the integrated circuit device 51 shown in FIG. 12 is connected are shown in FIG. 14 as an example. At this time, the operating frequency of the LSI 53 is 12 MHz. As shown in FIG. 14, since a frequency resonance of 168 MHz occurs between the printed wiring board and the LSI, the voltage is particularly high in this portion.

As shown in step S17, the frequency-axis/time-axis conversion unit 11 then converts the frequency-axis data in any junction specified by the operator among the frequency-axis data indicating the voltages of the junctions that were computed by the frequency-axis circuit analysis unit 10 into time-axis data by an inverse Fourier transform, or by computing the sum of the sine waveforms for the frequencies. The time-axis data are outputted to the display unit 12.

As shown in step S18, the display unit 12 then displays the time-axis data that were converted by the frequency-axis/time-axis conversion unit 11. An example of the time-axis data obtained in this manner is shown in FIG. 15. As shown in FIG. 15, the power supply voltage in a certain position of the integrated circuit device varies periodically over time. The display unit 12 displays the power supply voltage as time-axis data, whereby the fluctuation ΔV of the power supply voltage can be easily calculated.

In the present embodiment, the evaluation of the integrated circuit device shown in steps S1 through S18 is performed to aid in designing the integrated circuit device. Specifically, during the process of designing the integrated circuit device, the integrated circuit device is appropriately evaluated in mid-design according to the method described above, and the fluctuation ΔV of the power supply voltage is calculated in the portion in which the LSI is mounted. When the fluctuation ΔV exceeds an allowable range, a redesign is carried out by changing the position of the decoupling capacitor, or by another method, and the design is reevaluated.

The effect of the present embodiment will next be described. The integrated circuit device in the present embodiment is analyzed in the frequency axis rather than in the time axis. An analysis of the steady state can thereby be performed from the beginning, without the need to wait until the integrated circuit device passes through the transient state to the steady state, as in the case of a time-axis analysis. The analysis time of about one to two days that was required for a time-axis analysis can thereby be shortened to a period of several seconds to several minutes. As a result, the results of evaluating the power supply voltage fluctuation during design of the integrated circuit device can be rapidly returned, and the efficiency of the design of the integrated circuit device can be significantly enhanced.

In the present embodiment, since the results of analysis using frequency-axis data are converted to time-axis data, the temporal fluctuation of the power supply voltage can easily be calculated.

Furthermore, the operating characteristics of the LSI are inputted as a time-axis waveform and clock frequency of the pulse current at the time of switching in the present embodiment. Therefore, even when the clock frequency is changed, a reevaluation can easily be performed merely by re-inputting the clock frequency. All of the data must be re-inputted when the operating characteristics of the LSI are inputted as frequency-axis data.

Figure 16A:
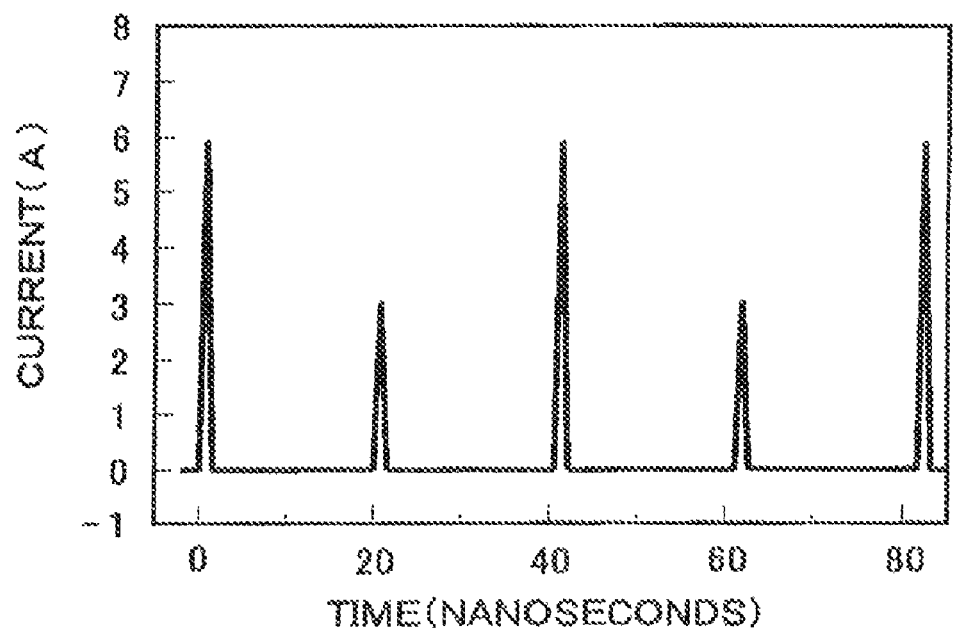
FIG. 16A is a graph showing the time-axis data of the current flowing in the LSI when the clock frequency is 24 MHz, wherein time is indicated on the horizontal axis, and the current value is indicated on the vertical axis.
Figure 16B:
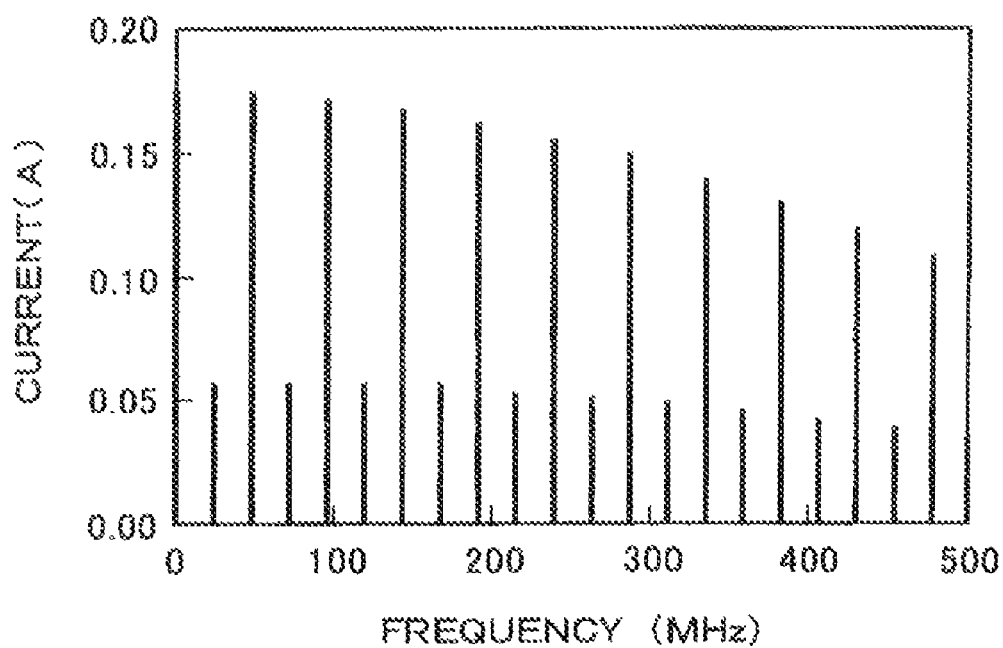
FIG. 16B is a graph showing the frequency-axis data of the current flowing in the LSI when the clock frequency is 24 MHz, wherein the frequency is indicated on the horizontal axis, and the current value is indicated on the vertical axis.

These effects will be described in detail hereinafter. As previously mentioned, FIGS. 13A and 13B show the time-axis data and the frequency-axis data of the internal current of the LSI in a case in which the clock frequency is 12 MHz, but the time-axis data and the frequency-axis data for a case in which the clock frequency in the same LSI is changed to 24 MHz are shown in FIGS. 16A and 16B. Specifically, FIG. 16A is a graph showing the time-axis data of the current flowing in the LSI when the clock frequency is 24 MHz, wherein time is indicated on the horizontal axis, and the current value is indicated on the vertical axis; and FIG. 16B is a graph showing the frequency-axis data of the current flowing in the LSI when the clock frequency is 24 MHz, wherein the frequency is indicated on the horizontal axis, and the current value is indicated on the vertical axis.

When the LSI current characteristics are displayed as time-axis data in a comparison between FIGS. 13A and 16A, there is almost no change in the waveform even when the clock frequency is changed from 12 MHz to 24 MHz, and the period is merely divided in half. The reason for this is that the waveform of the pulse current at the switching time generally does not depend on the clock frequency. Consequently, when the current characteristics of the LSI are inputted as time-axis data, the clock frequency need only be re-inputted when the clock frequency is changed. A flexible response to a change in clock frequency can thereby be made. However, as shown in FIGS. 13B and 16B, the frequency distribution varies significantly when the clock frequency varies in a case in which the same current characteristics are displayed as frequency-axis data. Consequently, when the LSI current characteristics are inputted as frequency-axis data, current data must be prepared for each frequency when the clock frequency is varied. The time required for data entry therefore increases.

Furthermore, in the present embodiment, the LSI equivalent circuit creation unit 6 stores a plurality of equivalent circuit models and selects a single equivalent circuit model according to the purpose of evaluation and the type of LSI of the integrated circuit device under evaluation. The appropriate equivalent circuit can thereby be created according to the type of LSI and the purpose of evaluation.

In the present embodiment, a printer or other printing unit may be provided instead of the display unit 12 (see FIG. 1), and the time-axis data that are converted by the frequency-axis/time-axis conversion unit 11 may be printed as a hard copy. A display unit and a printing unit may also be jointly used.

The structures shown in FIG. 1 may be formed as hardware. Alternatively, the structures shown in FIG. 1 may be formed by software in one or a plurality of computers. For example, the structures may be implemented by a single personal computer. In this instance, printed wiring board information input unit 3, the power supply regulator information input unit 5, and the LSI information input unit 7 shown in FIG. 1 may be implemented through the joint use of a display panel and the keyboard, mouse, or trackball of a personal computer. Specifically, an input screen may be displayed on the display panel of a personal computer, and an operator may input the information using the keyboard, mouse, trackball, or other component of the personal computer according to the input screen. The display unit 12 may be created using the display panel of a personal computer. Furthermore, components other than the input units 3, 5, and 7, and the display unit 12 may be created by the CPU (Central Processing Unit) and memory of a personal computer.

In this case, the functions of the components shown in FIG. 1 are carried out by the personal computer according to a program. Specifically, the evaluation program of the present embodiment is an evaluation program for an integrated circuit device, for causing a computer to evaluate fluctuation of a power supply voltage in an integrated circuit device that is provided with a printed wiring board, the LSI mounted on the printed wiring board, and a power supply regulator for supplying a power supply voltage to the LSI via the printed wiring board. The evaluation program causes the computer to execute a printed wiring board equivalent circuit creation routine for creating an equivalent circuit of a power supply circuit for transmitting the power supply voltage in the printed wiring board; a power supply regulator equivalent circuit creation routine for creating an equivalent circuit of the power supply regulator; an LSI equivalent circuit creation routine for creating an equivalent circuit of the LSI; a time-axis/frequency-axis conversion routine for converting the peak waveform of the power supply current at the switching time in the LSI, and the clock frequency of the LSI to frequency-axis data; an equivalent circuit synthesis routine for synthesizing the equivalent circuit of the power supply circuit, the equivalent circuit of the power supply regulator, and the equivalent circuit of the LSI to create an equivalent circuit of the integrated circuit device that includes the frequency-axis data; an analysis routine for using the frequency axis data to analyze the equivalent circuit of the integrated circuit device in a frequency axis and compute a power supply voltage for each frequency; and a frequency-axis/time-axis conversion routine for converting the frequency axis data that indicate the power supply voltage of each frequency into time-axis data.

Figure 17:
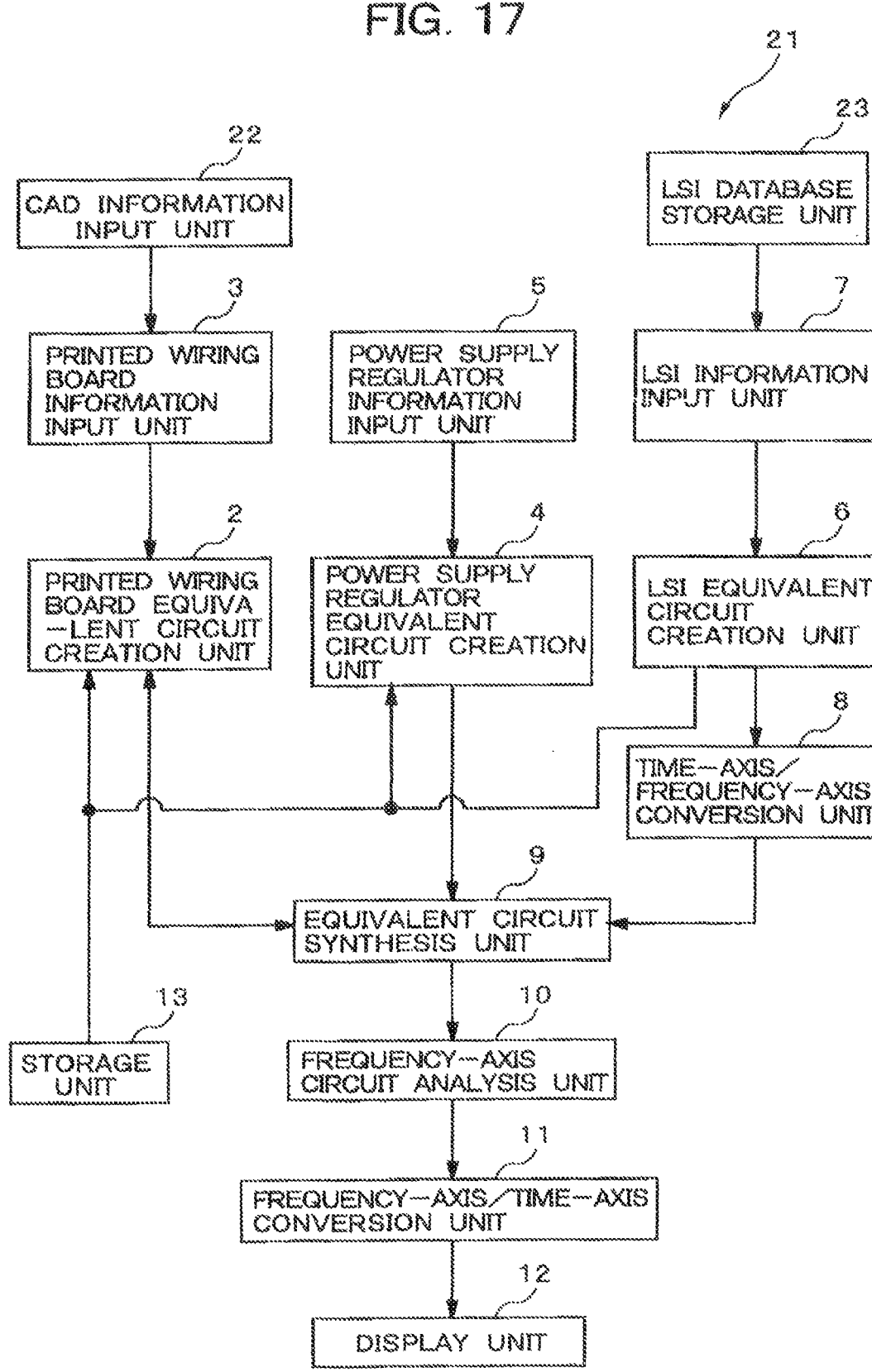
FIG. 17 is a block diagram showing the evaluation device for an integrated circuit device according to Embodiment 2 of the present invention.

Embodiment 2 of the present invention will next be described. FIG. 17 is a block diagram showing the evaluation device for an integrated circuit device according to the present embodiment. As shown in FIG. 17, a CAD information input unit 22 is provided, and is connected to the printed wiring board information input unit 3 in the evaluation device 21 of the present embodiment. The CAD information input unit 22 inputs design information of the printed wiring board created by CAD into the printed wiring board information input unit 3 as layout information. An LSI database storage unit 23 is provided to the evaluation device 21, and the LSI database storage unit 23 is connected to the LSI information input unit 7. The LSI database storage unit 23 stores LSI information that has a high usage frequency as a database, and the LSI information input unit 7 is capable of reading the LSI information from the LSI database storage unit 23. Structural aspects of the evaluation device of the present embodiment other than those described above are the same as in Embodiment 1.

Following is a description of the operation of the evaluation device of the present embodiment thus configured, i.e., the evaluation method for an integrated circuit device according to the present embodiment. In the present embodiment, the design information of the printed wiring board created by CAD is read as layout information via the CAD information input unit 22, instead of the layout information of the printed wiring board being manually inputted by an operator operating a keyboard in step S1 shown in FIG. 9. The model number or the like of the LSI is inputted to retrieve the information of the LSI from the LSI database storage unit 23, instead of the information of the LSI being manually inputted by an operator operating a keyboard in step S3. Operations of the present embodiment other than those described above are the same as in Embodiment 1.

In the present embodiment, the CAD information input unit 22 is used to read CAD data as the layout information of the printed wiring board, information for specifying the LSI to be evaluated, e.g., the model number or the like of the LSI, is inputted to the LSI information input unit 7, and the information of the LSI is read from the database using the LSI database storage unit 23. The time required to input the information can thereby be significantly reduced. The integrated circuit device can thereby be more rapidly evaluated that in Embodiment 1, and the designing of the integrated circuit device can be more efficiently supported. Effects in the present embodiment other than those described above are the same as in Embodiment 1.

Figure 18:
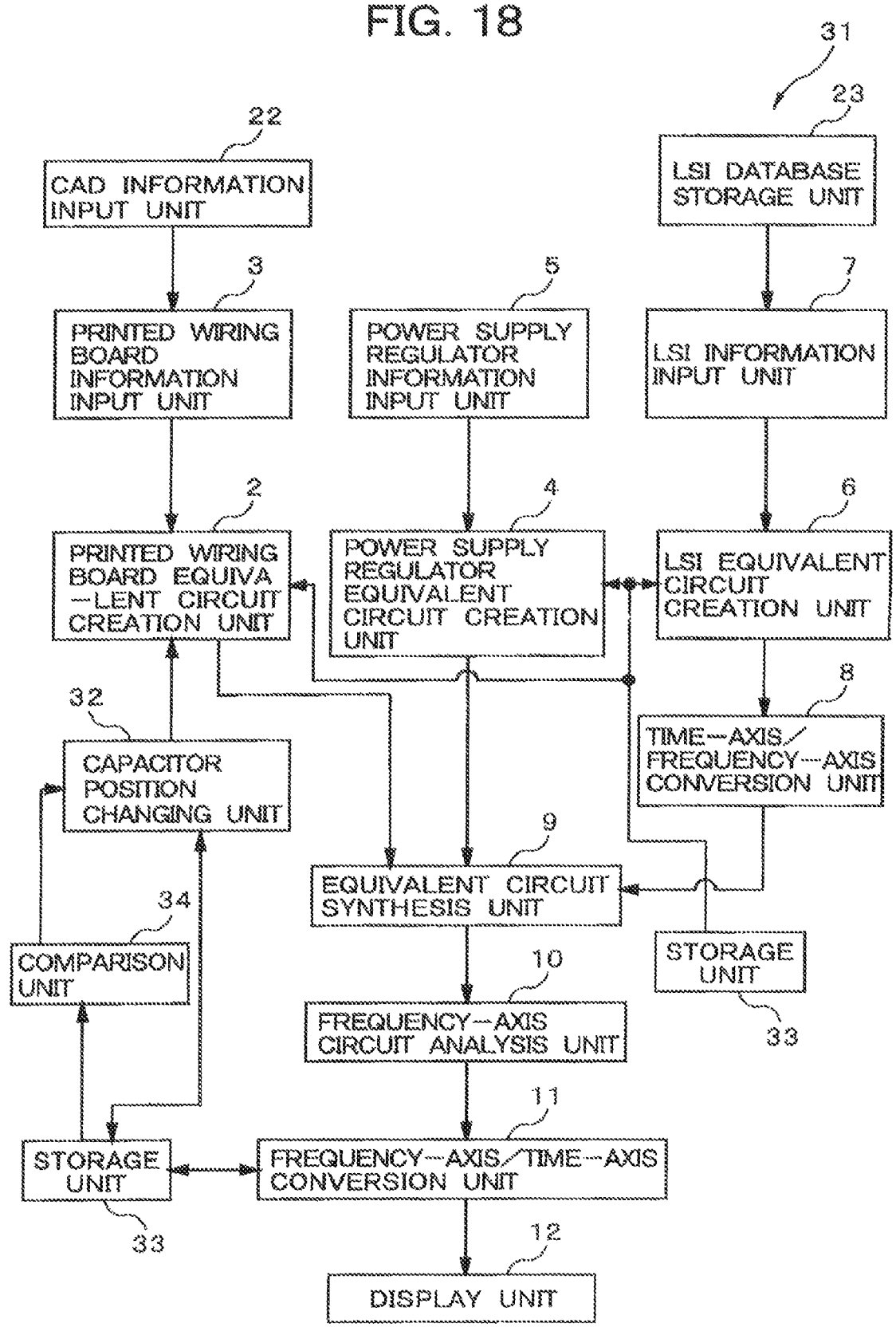
FIG. 18 is a block diagram showing the evaluation device for an integrated circuit device according to Embodiment 3 of the present invention.

Embodiment 3 of the present invention will next be described. FIG. 18 is a block diagram showing the evaluation device for an integrated circuit device according to the present embodiment. As shown in FIG. 18, the evaluation device 31 of the present embodiment is provided with a capacitor position changing unit 32 connected to the printed wiring board equivalent circuit creation unit 2, a storage unit 33 connected to the capacitor position changing unit 32 and the frequency-axis/time-axis conversion unit 11, and a comparison unit 34 connected to the storage unit 33 and the capacitor position changing unit 32.

The capacitor position changing unit 32 reads the layout information of the printed wiring board inputted to the printed wiring board equivalent circuit creation unit 2 from the storage unit 33, changes the position of a capacitor in the layout information to create new layout information, and re-inputs the new layout information to the printed wiring board equivalent circuit creation unit 2. At this time, the position of the capacitor is changed by reconnecting the equivalent circuit EC2 that represents a decoupling capacitor from one junction to another junction that corresponds to a capacitor mounting position in the two-dimensional equivalent circuit EC1 that represents the power supply circuit of the printed wiring board.

The storage unit 33 stores the new layout information created by the capacitor position changing unit 32, and stores the fluctuation of the power supply voltage that is obtained by the process in which the equivalent circuit synthesis unit 9 synthesizes an equivalent circuit for analysis on the basis of the new layout information, the frequency-axis circuit analysis unit 10 analyzes the equivalent circuit, and the frequency-axis/time-axis conversion unit 11 converts the analysis result to time-axis data. The comparison unit 34 compares the fluctuation for each capacitor position stored in the storage unit 33 with a reference value, and determines whether the fluctuation is within an allowable range.

Figure 19:
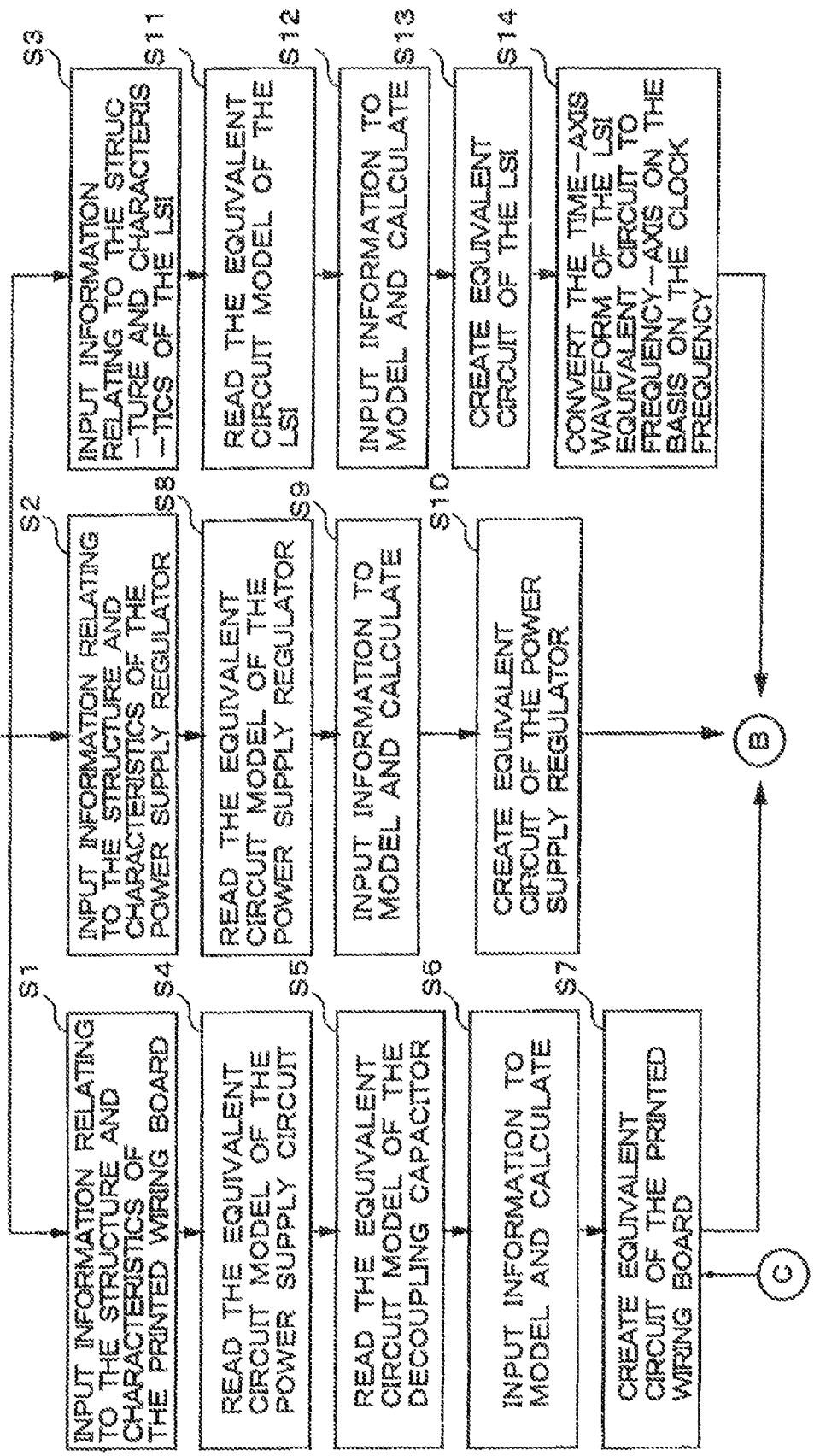
FIG. 19 is a flowchart showing the evaluation method for an integrated circuit device according to Embodiment 3 of the present invention.
Figure 20:
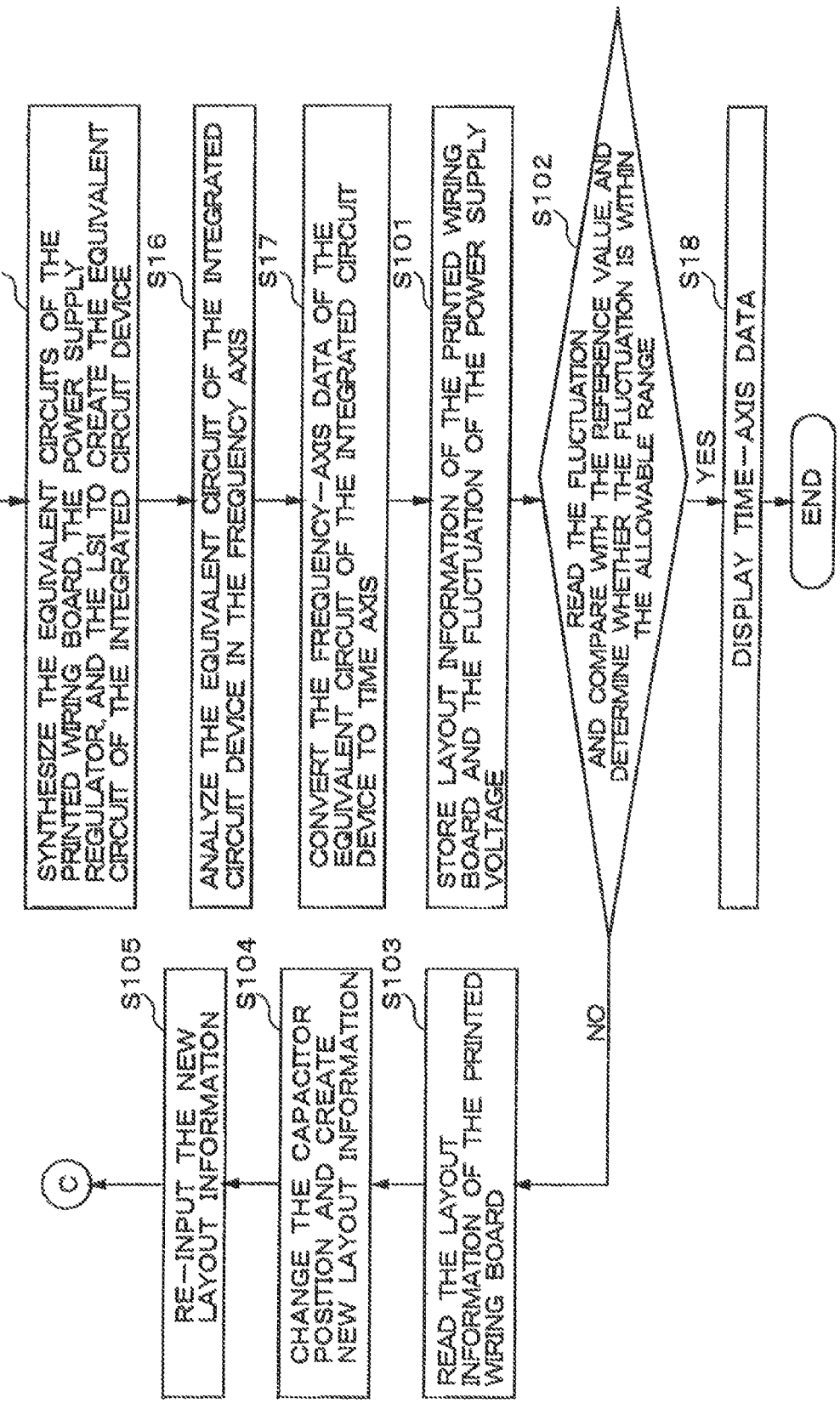
FIG. 20 is a flowchart showing the evaluation method for an integrated circuit device according to Embodiment 3 of the present invention, wherein the steps subsequent to FIG. 19 are shown.

Following is a description of the operation of the evaluation device of the present embodiment thus configured, i.e., the evaluation method for an integrated circuit device according to the present embodiment. FIGS. 19 and 20 are flowcharts showing the evaluation method for an integrated circuit device according to the present embodiment. Steps S1 through S18 shown in FIGS. 19 and 20 are the same as steps S1 through S18 shown in FIGS. 9 and 10. In the present embodiment, after the sequence shown in steps S1 through S17 of FIG. 9 is completed for a certain integrated circuit device, the layout information of the printed wiring board, and the computed fluctuation of the power supply voltage are stored in the storage unit 33 as shown in step S101. At this time, the equivalent circuit of the printed wiring board created in step S7, the equivalent circuit of the power supply regulator created in step S10, and the equivalent circuit of the LSI stored in step S13 are stored in the storage unit 33. The comparison unit 34 then reads the fluctuation stored in the storage unit 33, compares the fluctuation with the reference value, and determines whether the fluctuation is within the allowable range, as shown in step S102.

When the fluctuation is not within the allowable range, the process proceeds to step S103, and the capacitor position changing unit 32 reads from the storage unit 33 the layout information of the printed wiring board that was inputted to the printed wiring board equivalent circuit creation unit 2. The position of the capacitor is then changed in the layout information according to a certain pre-programmed rule, and new layout information is created, as shown in step S104. The new layout information is then re-inputted to the printed wiring board equivalent circuit creation unit 2, as shown in step S105. Steps S7 and S15 through S17 are then performed to compute the fluctuation of the power supply voltage on the basis of the new layout information, and the computed result is correlated with the changed layout information and inputted to the storage unit 33, as shown in step S101. As shown in step 102, the comparison unit 34 reads the fluctuation from the storage unit 33, compares the fluctuation with the reference value, and determines whether the fluctuation is within the allowable range. When the fluctuation is within the allowable range, the process proceeds to step S18, and the time-axis data are displayed in the display unit 12. When the fluctuation is outside the allowable range, steps 103 through 105, step S7, steps S15 through S17, and steps S101 through S102 are repeated. Operations in the present embodiment other than those described above are the same as in Embodiment 2.

In the present embodiment, the operation for changing the position of a capacitor in the integrated circuit device and calculating the fluctuation of the power supply voltage is a What-if analysis loop, and this loop can be automatically repeated until the desired characteristics are obtained, or until an evaluation has been performed for all the capacitor arrangement positions. The position of the capacitor can thereby be determined semi-automatically, and the designing of the integrated circuit device can be efficiently supported.

In the present embodiment, the position of a capacitor in the integrated circuit device is moved within a certain region, and the position can be found at which the fluctuation of the power supply voltage is minimized within the region. The varied parameter is not limited to the position of a capacitor, and analysis can be repeated while various parameters in the equivalent circuits of the integrated circuit device are changed. The parameter for obtaining the desired characteristics can thereby be semi-automatically found.

Figure 21:
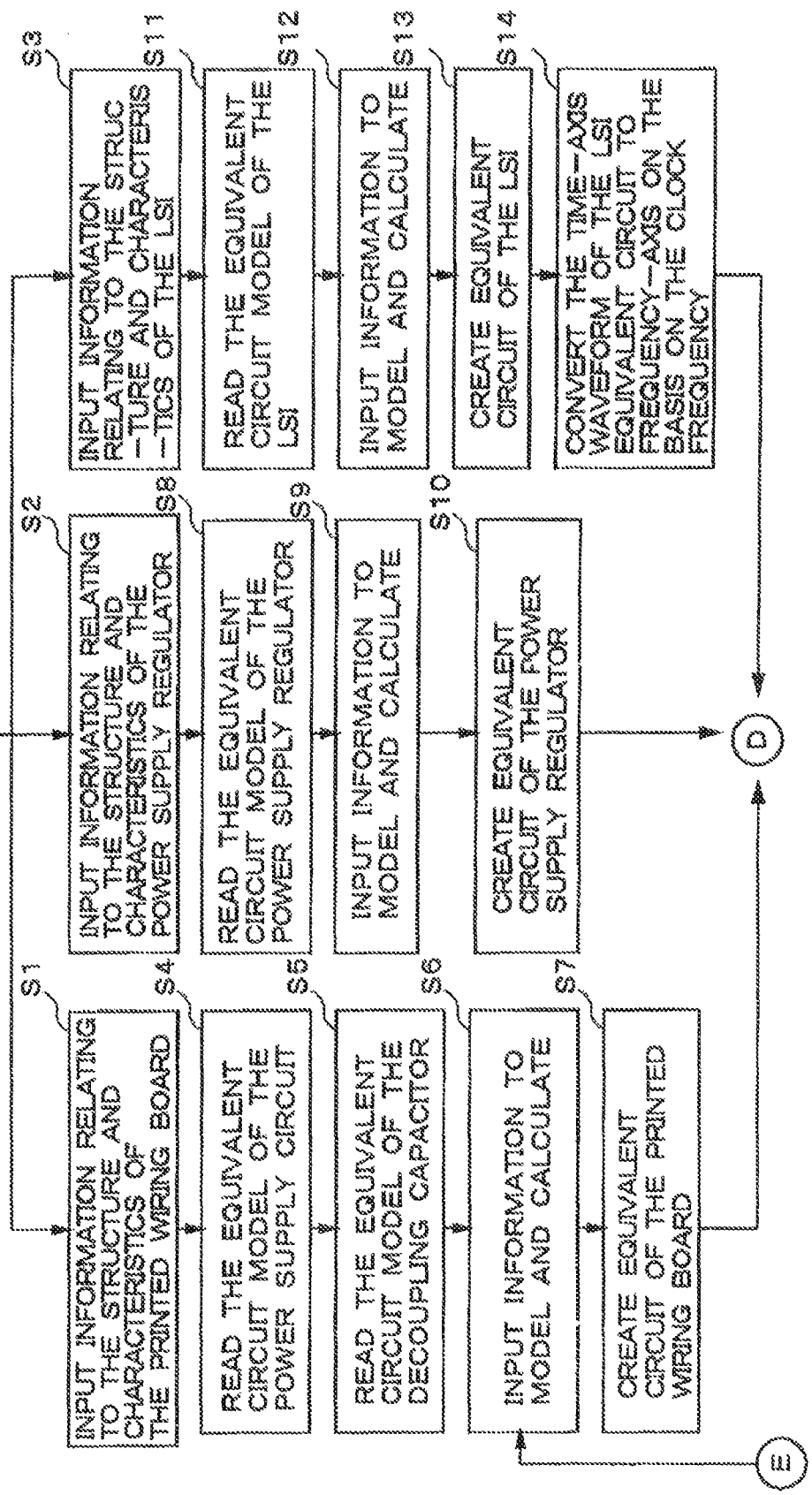
FIG. 21 is a flowchart showing the evaluation method for an integrated circuit device according to a modified example of Embodiment 3.
Figure 22:
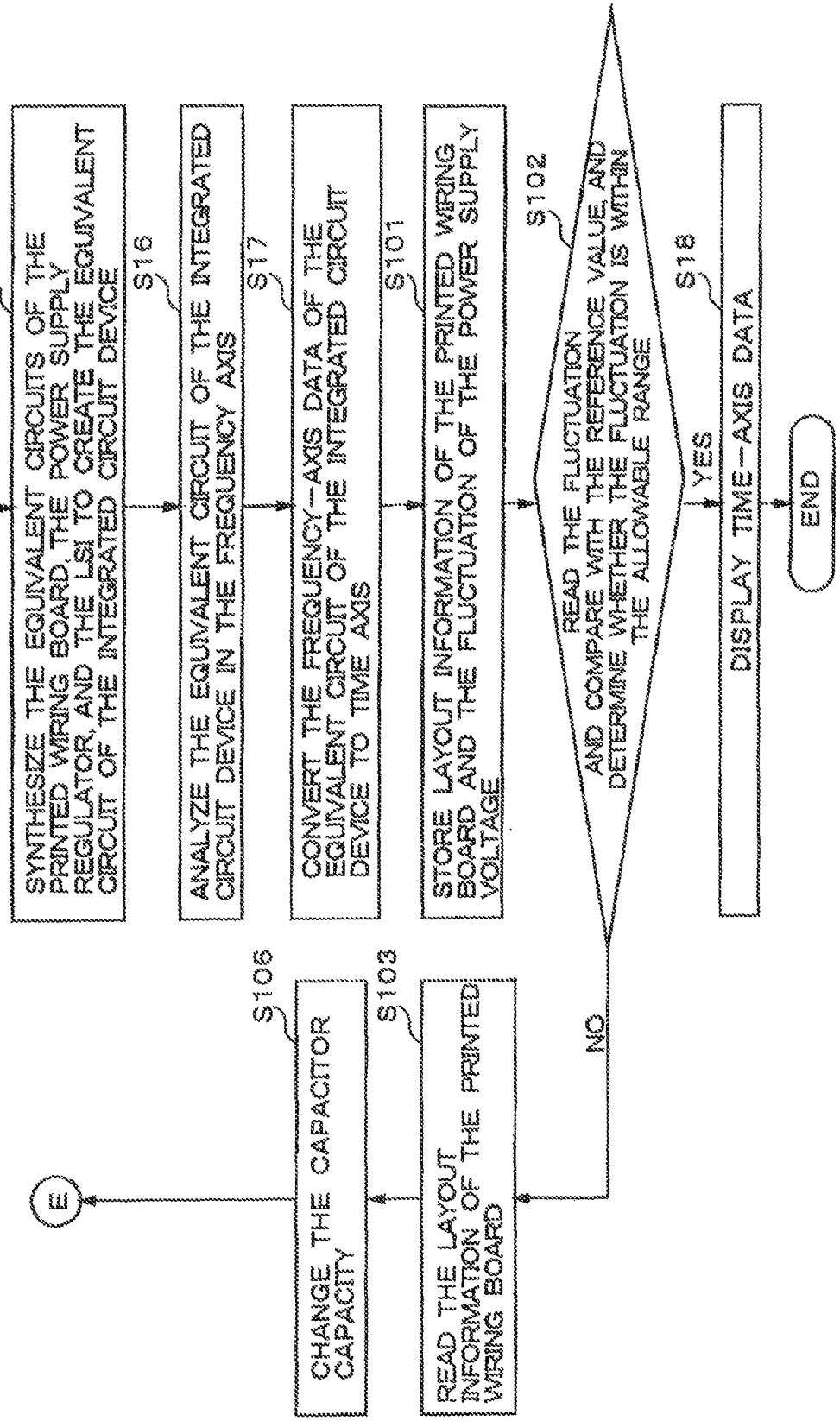
FIG. 22 is a flowchart showing the evaluation method for an integrated circuit device according to a modified example of Embodiment 3, wherein the steps subsequent to FIG. 21 are shown.
Figure 23:
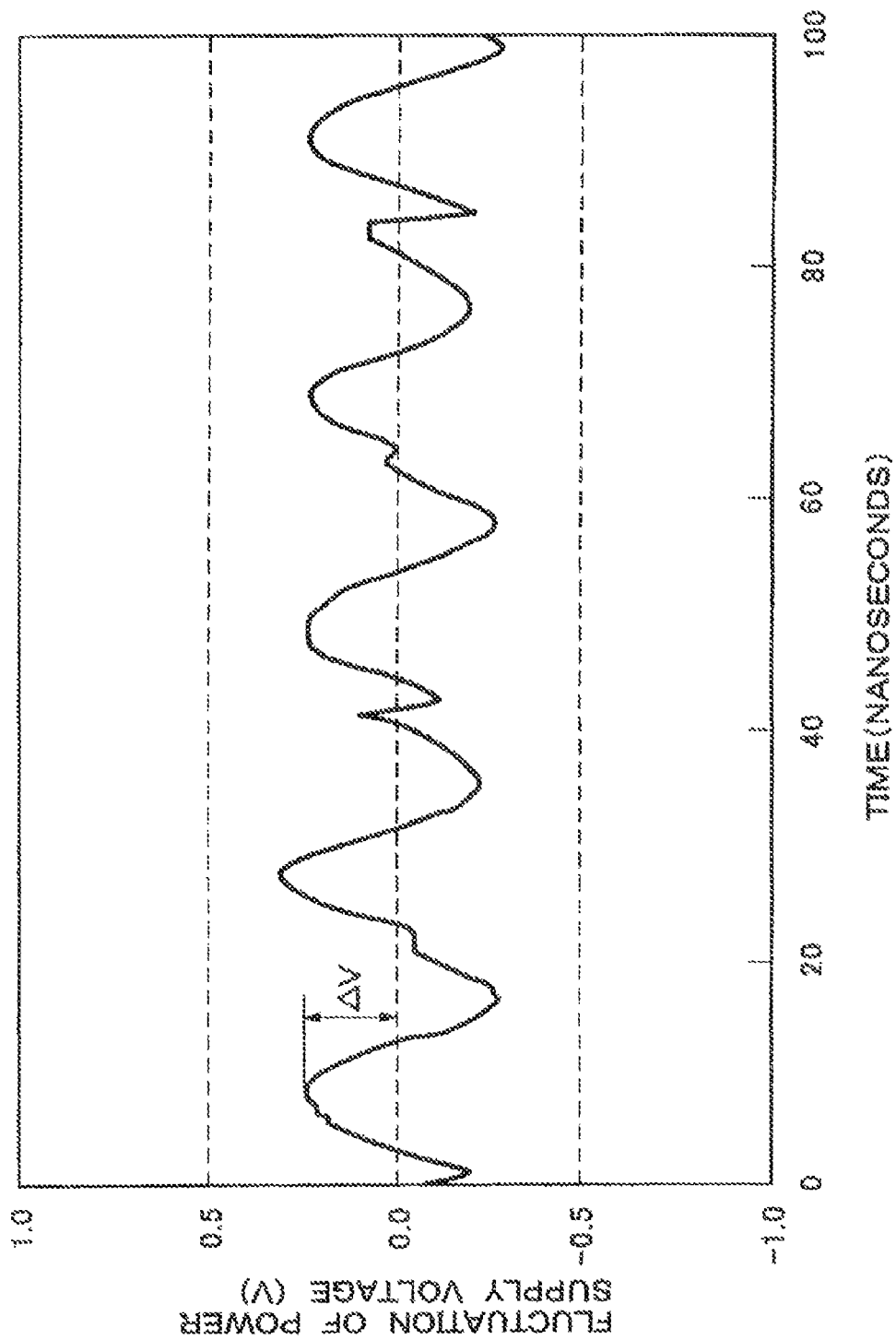
FIG. 23 is a graph showing the frequency-axis data of the power supply voltage of the portion of the integrated circuit device in which the LSI is mounted after the capacity of the decoupling capacitor is changed, wherein the frequency is indicated on the horizontal axis, and the power supply voltage is indicated on the vertical axis.

A modified example of Embodiment 3 will next be described. FIGS. 21 and 22 are flowcharts showing the evaluation method for an integrated circuit device according to the present modified example. FIG. 23 is a graph showing the frequency-axis data of the power supply voltage of the portion of the integrated circuit device in which the LSI is mounted after the capacity of the decoupling capacitor is changed, wherein the frequency is indicated on the horizontal axis, and the power supply voltage is indicated on the vertical axis. In the evaluation device of the present modified example, a capacitor capacity changing unit (not shown) for changing the capacity of a decoupling capacitor is provided instead of the capacitor position changing unit 32 (see FIG. 18) in Embodiment 3. In the present modified example as shown in FIGS. 21 and 22, step S106 is executed instead of steps S104 and S105 in FIG. 20, and the process then proceeds to step S6. Specifically, when the fluctuation is determined to be outside the allowable range in step 102, the process proceeds to step S103, and the capacitor capacity changing unit reads from the storage unit 33 the layout information of the printed wiring board that was inputted to the printed wiring board equivalent circuit creation unit 2.

The capacity of the decoupling capacitor is then changed, as shown in step S106. For example, in the printed wiring board 52 shown in FIG. 11, the capacity of the decoupling capacitor 54e disposed directly under the LSI 53 among the nine decoupling capacitors 54a through 54i mounted to the printed wiring board 52 is changed from 0.01 µF to 0.1 µF. The process then returns to step S6, the change is inputted to the equivalent circuit model, and calculation is performed again.

The process again repeats step S7, steps S15 through S17, and steps S101 and S102, and the power supply voltage in a certain position of the integrated circuit device is computed. At this time, the fluctuation $\Delta V$ of the power supply voltage is 0.25 V, as shown in FIG. 23, which is significantly less than the fluctuation of 0.45 V (see FIG. 15) in the power supply voltage prior to changing the capacity of the decoupling capacitor 54e. In step S102, a determination is made as to whether the fluctuation is within the allowable range. For example, when the upper limit of the allowable range is 0.3 V, the fluctuation (0.25 V) after the capacity change is determined to be within the allowable range, the process proceeds to step S18, and the time-axis data are displayed. Structural aspects and operations in the present modified example other than those described above are the same as in Embodiment 3. According to the present modified example, the capacity of a capacitor can be semi-automatically determined, and the designing of the integrated circuit device can be efficiently supported.

After the layout information of the printed substrate and other necessary information is inputted to the evaluation device, the time required for analysis accounts for most of the processing time in the evaluation of an integrated circuit device. In the embodiments of the present invention described above, although the process shown in step S14 (see FIG. 9, for example) is required for converting the time-axis data to frequency-axis data, the sequence of steps from the creation of the equivalent circuits to analysis and conversion, i.e., the sequence of processing in steps S7, S10, and S13, and steps S14 through S17 shown in FIG. 9, involves a processing time of about 15 to 20 seconds. Most of this time is required for the analysis in step S16. In contrast, the conventional time-axis analysis requires four to five hours. According to the embodiments described above, the analysis time can be significantly reduced in comparison to the conventional technique. As described in Embodiment 3 (see FIG. 20) and the modified example thereof (see FIG. 22), when the step for changing the position and/or capacity of a capacitor is repeated, analysis must be executed each time the position and/or capacity of the capacitor is changed, and the processing-time-reducing effects described above become more significant as the number of repetitions of analysis increases. It is usually rare for the design to be completed in a single layout design in the layout design stage of a printed substrate, and repeated changes are usually made. The effects of the present invention are therefore extremely significant.

An example was described in Embodiment 3 in which the position of the capacitor was changed in step S104 when a determination was made in step S102 that the fluctuation was not within the allowable range, and an example was described in the modified example of Embodiment 3 in which the capacity of the capacitor was changed in step S106 when a determination was made in step S102 that the fluctuation was not within the allowable range. However, one or both of the position and the capacity of the capacitor may be changed in the present invention when a determination is made in step S102 that the fluctuation is not within the allowable range. In this case, a configuration may be adopted in which a step is provided for determining based on the changed information whether the position of the capacitor was changed, or the capacity of the capacitor was changed after the position and/or capacity of the capacitor is changed. When the position of the capacitor is changed, the processes shown in step S7, steps S15 through S17, and steps S101 and S102 shown in FIGS. 19 and 20 are executed. When the capacity of the capacitor is changed, and when both the position and the capacity of the capacitor are changed, the processes shown in steps S6 and S7, steps S15 through S17, and steps S101 and S102 shown in FIGS. 21 and 22 are executed.

An integrated circuit device in which a single LSI was mounted on a printed wiring board was described in the embodiments, but the present invention is not limited by this configuration, and a plurality of LSIs may be mounted on a single printed wiring board. Multiple levels may also be provided rather than a single level for the power supply voltage.

Furthermore, examples were described in the abovementioned embodiments in which the layout information and the numerical value information of the printed wiring board were inputted to the printed wiring board equivalent circuit creation unit 2 to create the equivalent circuit of the printed wiring board, but the necessary parameters for creating the equivalent circuit of the printed wiring board may all be inputted as numerical information.

INDUSTRIAL APPLICABILITY

The present invention is useful for supporting the design of an integrated circuit device, for example.

The invention claimed is:

1. An evaluation device, for evaluating fluctuation of a power supply voltage in an integrated circuit device, said evaluation device comprising:
   an equivalent circuit creation unit for creating an equivalent circuit for said integrated circuit device and converting into frequency axis data power supply behavior at switching time in an active circuit element of said integrated circuit device that is inputted as time axis data;
   an analysis unit for using said frequency-axis data to analyze said equivalent circuit in a frequency axis and compute a power supply voltage for each frequency; and
   a frequency-axis/time-axis conversion unit for converting the frequency axis-data that indicates the power supply voltage of each frequency into time-axis data.

2. The evaluation device according to claim 1, wherein the time axis data that indicates the power supply behavior at the switching time in said active circuit element are a time axis waveform of a pulse of a power supply current at said switching time, and a clock frequency of said active circuit element.

3. The evaluation device according to claim 1, wherein said integrated circuit device comprises a wiring substrate, said active circuit element mounted on the wiring substrate, and a power supply regulator for supplying a power supply voltage to said active circuit element via said wiring substrate; and
said equivalent circuit creation unit has:
   a wiring substrate equivalent circuit creation unit for creating an equivalent circuit of a power supply circuit for transmitting said power supply voltage in said wiring substrate;
   a power supply regulator equivalent circuit creation unit for creating an equivalent circuit of said power supply regulator;
   an active circuit element equivalent circuit creation unit for creating an equivalent circuit of said active circuit element;
   a time-axis/frequency-axis conversion unit for converting the power supply behavior at the switching time in said active circuit element into frequency-axis data; and
   an equivalent circuit synthesis unit for synthesizing the equivalent circuit of said power supply circuit, the equivalent circuit of said power supply regulator, and the equivalent circuit of said active circuit element to create an equivalent circuit of said integrated circuit device that includes said frequency-axis data.

4. The evaluation device according to claim 3, wherein said power supply regulator equivalent circuit creation unit creates the equivalent circuit of said power supply circuit by inputting values of parameters into an equivalent circuit model of said power supply regulator for which the values of said parameters have not been inputted.

5. The evaluation device according to claim 3, wherein said active circuit element equivalent circuit creation unit creates the equivalent circuit of said active circuit element by inputting values of parameters into an equivalent circuit model of said active circuit element for which the values of said parameters have not been inputted.

6. The evaluation device according to claim 5, wherein said active circuit element equivalent circuit creation unit selects one model from a plurality of models of the equivalent circuit of said active circuit element according to the active circuit element of said integrated circuit device under evaluation.

7. The evaluation device according to claim 3, wherein said wiring substrate equivalent circuit creation unit creates the equivalent circuit of said power supply circuit by inputting values of parameters into an equivalent circuit model of said power supply circuit for which the values of said parameters have not been inputted.

8. The evaluation device according to claim 7, wherein said wiring substrate equivalent circuit creation unit has a computing unit for computing the values of said parameters based on layout information of said power supply circuit.

9. The evaluation device according to claim 8, wherein CAD information is inputted as said layout information in said wiring substrate equivalent circuit creation unit.

10. The evaluation device according to claim 8, wherein said power supply circuit is provided with wiring and a capacitor that is disposed on the wiring, and the evaluation device has:
   a capacitor changing unit for changing at least one of position and capacitance of said capacitor in said layout information and creating new layout information;
   a storage unit for storing the fluctuation of said power supply voltage computed based on said new layout information; and
   a comparison unit for comparing the stored fluctuation of said power supply voltage with a reference value.

11. The evaluation device according to claim 1, wherein said equivalent circuit creation unit, said analysis unit, and said frequency-axis/time-axis conversion unit are implemented by a program within a single personal computer.

12. The evaluation device according to claim 1, further comprising a display unit for displaying the time-axis data that are converted by said frequency-axis/time-axis conversion unit.

13. The evaluation device according to claim 1, further comprising a printing unit for printing the time-axis data that are converted by said frequency-axis/time-axis conversion unit.

14. The evaluation device according to claim 1, wherein the evaluation device is used to support design of said integrated circuit device.

15. An evaluation method for evaluating fluctuation of a power supply voltage in an integrated circuit device, said evaluation method, being performed by an evaluation device, comprising:
 an equivalent circuit creation step of inputting information regarding an integrated circuit under evaluation, creating an equivalent circuit for said integrated circuit device based on the input information, inputting time-axis data representing power supply behavior at switching time in an active circuit element of said integrated circuit device, and converting the time-axis data into frequency-axis data;
 an analysis step for of using said frequency-axis data to analyze said equivalent circuit in a frequency axis and compute a power supply voltage for each frequency based on the analysis;
 a frequency-axis/time-axis conversion step for of converting the frequency-axis data that indicates the power supply voltage of each frequency into time-axis data and
 an output step of outputting the time-axis data.

16. The evaluation method according to claim 15, wherein the time axis data that indicates the power supply behavior at the switching time in said active circuit element are a time axis waveform of a pulse of a power supply current at said switching time, and a clock frequency of said active circuit element.

17. The evaluation method according to claim 15, wherein
 said integrated circuit device comprises a wiring substrate, said active circuit element mounted on the wiring substrate, and a power supply regulator for supplying a power supply voltage to said active circuit element via said wiring substrate; and
 said equivalent circuit creation step has:
 a wiring substrate equivalent circuit creation step for creating an equivalent circuit of a power supply circuit for transmitting said power supply voltage in said wiring substrate;
 a power supply regulator equivalent circuit creation step for creating an equivalent circuit of said power supply regulator;
 an active circuit element equivalent circuit creation step for creating an equivalent circuit of said active circuit element;
 a time-axis/frequency-axis conversion step for converting the power supply behavior at the switching time in said active circuit element into frequency-axis data; and
 an equivalent circuit synthesis step for synthesizing the equivalent circuit of said power supply circuit, the equivalent circuit of said power supply regulator, and the equivalent circuit of said active circuit element to create an equivalent circuit of said integrated circuit device that includes said frequency-axis data.

18. The evaluation method according to claim 17, wherein said power supply regulator equivalent circuit creation step is a step for creating the equivalent circuit of said power supply regulator by inputting values of parameters into an equivalent circuit model of said power supply regulator for which the values of said parameters have not been inputted.

19. The evaluation method according to claim 17, wherein said active circuit element equivalent circuit creation step is a step for creating the equivalent circuit of said active circuit element by inputting values of parameters into an equivalent circuit model of said active circuit element for which the values of said parameters have not been inputted.

20. The evaluation method according to claim 19, wherein said active circuit element equivalent circuit creation step has a step for selecting one model from a plurality of models of the equivalent circuit of said active circuit element, being pre-stored in a memory, according to the active circuit element of said integrated circuit device under evaluation.

21. The evaluation method according to claim 7, wherein said wiring substrate equivalent circuit creation step is a step for creating the equivalent circuit of said power supply circuit by inputting values of parameters into an equivalent circuit model, being pre-stored in a memory, of said power supply circuit for which the values of said parameters have not been inputted.

22. The evaluation method according to claim 21, wherein said wiring substrate equivalent circuit creation step has a step for computing the values of said parameters based on the layout information of said power supply circuit.

23. The evaluation method according to claim 21, wherein CAD information is used as said layout information in said wiring substrate equivalent circuit creation step.

24. The evaluation method according to claim 22, wherein said power supply circuit is provided with wiring and a capacitor that is disposed on the wiring, and the evaluation method has:
 a capacitor changing step for changing at least one of the position and capacitance of said capacitor in said layout information and creating new layout information;
 a storage step provided subsequent to said frequency-axis/time-axis conversion step, for storing the fluctuation of said power supply voltage computed based on said new layout information; and
 a comparison step for comparing the stored fluctuation of said power supply voltage with a reference value.

25. An evaluation program for causing a computer to evaluate fluctuation of a power supply voltage in an integrated circuit device, wherein said evaluation program is characterized in causing said computer to execute:
 an equivalent circuit creation routine, for creating an evaluation circuit for said integrated circuit device and converting into frequency-axis data power supply behavior at switching time in an active circuit element of said integrated circuit device that is inputted as time-axis data;
 an analysis routine for using said frequency-axis data to analyze said equivalent circuit in a frequency axis and compute a power supply voltage for each frequency; and
 a frequency-axis/time-axis conversion routine for converting the frequency-axis data that indicates the power supply voltage of each frequency into time-axis data.

26. The evaluation program according to claim 25, wherein the time axis data that indicates the power supply behavior at the switching time in said active circuit element are a peak waveform of a power supply current at said switching time, and a clock frequency of said active circuit element.

27. The evaluation program according to claim 25, wherein said integrated circuit device comprises a wiring substrate, said active circuit element mounted on the wiring substrate, and a power supply regulator for supplying a power supply voltage to said active circuit element via said wiring substrate; and said equivalent circuit creation routine has:
- a wiring substrate equivalent circuit creation routine for creating an equivalent circuit of a power supply circuit for transmitting said power supply voltage in said wiring substrate;
- a power supply regulator equivalent circuit creation routine for creating an equivalent circuit of said power supply regulator;
- an active circuit element equivalent circuit creation routine for creating an equivalent circuit of said active circuit element;
- a time-axis/frequency-axis conversion routine for converting the power supply behavior at the switching time in said active circuit element into frequency-axis data; and
- an equivalent circuit synthesis routine for synthesizing the equivalent circuit of said power supply circuit, the equivalent circuit of said power supply regulator, and the equivalent circuit of said active circuit element to create an equivalent circuit of said integrated circuit device that includes said frequency-axis data.

28. The evaluation program according to claim 27, wherein said power supply regulator equivalent circuit creation routine is a routine for creating the equivalent circuit of said power supply regulator by inputting values of parameters into an equivalent circuit model of said power supply regulator for which the values of said parameters have not been inputted.

29. The evaluation program according to claim 27, wherein said active circuit element equivalent circuit creation routine is a routine for creating the equivalent circuit of said active circuit element by inputting values of parameters into an equivalent circuit model of said active circuit element for which the values of said parameters have not been inputted.

30. The evaluation program according to claim 29, wherein said active circuit element equivalent circuit creation routine has a routine for selecting one model from a plurality of models of the equivalent circuit of said active circuit element according to the active circuit element of said integrated circuit device under evaluation.

31. The evaluation program according to claim 29, wherein said power supply circuit is provided with wiring and a capacitor that is disposed on the wiring, and the evaluation program causes said computer to execute:
- a capacitor changing routine for changing at least one of position and capacitance of said capacitor in said layout information and creating new layout information;
- a storage routine executed subsequent to said frequency-axis/time-axis conversion routine, for storing the fluctuation of said power supply voltage computed based on said new layout information; and
- a comparison routine for comparing the stored fluctuation of said power supply voltage with a reference value.

32. The evaluation program according to claim 27, wherein said wiring substrate equivalent circuit creation routine is a routine for creating the equivalent circuit of said power supply circuit by inputting values of parameters into an equivalent circuit model of said power supply circuit for which the values of said parameters have not been inputted.

33. The evaluation program according to claim 32, wherein said wiring substrate equivalent circuit creation routine has a routine for computing the values of said parameters based on layout information of said power supply circuit.

34. The evaluation program according to claim 33, wherein CAD information is inputted as said layout information in said wiring substrate equivalent circuit creation step.

35. An evaluation program for causing a computer to evaluate fluctuation of a power supply voltage in an integrated circuit device that is provided with a wiring substrate, an active circuit element mounted on the wiring substrate, and a power supply regulator for supplying a power supply voltage to said active circuit element via said wiring substrate, wherein said evaluation program is characterized in causing said computer to execute:
- a wiring substrate equivalent circuit creation routine for creating an equivalent circuit of a power supply circuit for transmitting said power supply voltage in said wiring substrate;
- a power supply regulator equivalent circuit creation routine for creating an equivalent circuit of said power supply regulator;
- an active circuit element equivalent circuit creation routine for creating an equivalent circuit of said active circuit element;
- a time-axis/frequency-axis conversion routine for converting a peak waveform of a power supply current at the switching time in said active circuit element, and a clock frequency of said active circuit element to frequency-axis data;
- an equivalent circuit synthesis routine for synthesizing the equivalent circuit of said power supply circuit, the equivalent circuit of said power supply regulator, and the equivalent circuit of said active circuit element to create an equivalent circuit of said integrated circuit device that includes said frequency-axis data;
- an analysis routine for using said frequency-axis data to analyze the equivalent circuit of said integrated circuit device in a frequency axis and compute a power supply voltage for each frequency; and
- a frequency-axis/time-axis conversion routine for converting the frequency-axis data that indicates the power supply voltage of each frequency into time-axis data.

36. The evaluation program according to claim 35, wherein said wiring substrate equivalent circuit creation routine is a routine for creating the equivalent circuit of said power supply circuit by computing values of parameters and inputting the values of said parameters into the equivalent circuit model of said power supply circuit for which the values of said parameters have not been inputted; and the wiring substrate equivalent circuit creation routine has a routine for computing the values of said parameters based on CAD information of said power supply circuit.

* * * * *

UNITED STATES PATENT AND TRADEMARK OFFICE
CERTIFICATE OF CORRECTION

PATENT NO. : 7,882,468 B2
APPLICATION NO. : 11/910779
DATED : February 1, 2011
INVENTOR(S) : Takashi Harada and Hiroshi Wabuka It is certified that error appears in the above-identified patent and that said Letters Patent is hereby corrected as shown below:

In the Claims

Column 21, Line 45: In Claim 1, delete "device," and insert -- device --.

Column 21, Line 50: In Claim 1, delete "frequency axis" and insert -- frequency-axis --.

Column 23, Line 26: In Claim 15, after "step" delete "for".

Column 23, Line 30: In Claim 15, after "step" delete "for".

Column 23, Line 32: In Claim 15, delete "data and" and insert -- data; and --.

Column 24, Line 17: In Claim 21, delete "claim 7," and insert -- claim 17, --.

Column 24, Line 26: In Claim 22, after "based on" delete "the".

Column 26, Line 30: In Claim 35, after "current at" delete "the".

Signed and Sealed this
Ninth Day of July, 2013

Teresa Stanek Rea
*Acting Director of the United States Patent and Trademark Office*